(12) United States Patent
Li

(10) Patent No.: US 10,024,658 B2
(45) Date of Patent: *Jul. 17, 2018

(54) CMM MOVING PATH ADJUSTMENT ASSISTING METHOD AND APPARATUS

(71) Applicant: MITUTOYO CORPORATION, Kanagawa (JP)

(72) Inventor: Liming Li, Rancho Cucamonga, CA (US)

(73) Assignee: MITUTOYO CORPORATION, Kanagawa (JP)

( * ) Notice: Subject to any disclaimer, the term of this patent is extended or adjusted under 35 U.S.C. 154(b) by 190 days.

This patent is subject to a terminal disclaimer.

(21) Appl. No.: 15/008,972

(22) Filed: Jan. 28, 2016

(65) Prior Publication Data

US 2016/0146599 A1 May 26, 2016

Related U.S. Application Data

(62) Division of application No. 13/365,539, filed on Feb. 3, 2012.

(Continued)

(51) Int. Cl.
*G01B 5/008* (2006.01)
*G01B 21/04* (2006.01)
*G05B 19/4093* (2006.01)

(52) U.S. Cl.
CPC ......... *G01B 21/04* (2013.01); *G05B 19/4093* (2013.01); *G05B 2219/35128* (2013.01); *Y02P 90/265* (2015.11)

(58) Field of Classification Search
CPC .................................................. G01B 21/04
See application file for complete search history.

(56) References Cited

U.S. PATENT DOCUMENTS 5,189,806 A * 3/1993 McMurtry ............. G01B 21/04
33/503
5,737,244 A * 4/1998 Ruck .................... G05B 19/401
33/503

(Continued)

FOREIGN PATENT DOCUMENTS

JP 2004-294311 A 10/2004
JP 2007-249267 A 9/2007

(Continued)

OTHER PUBLICATIONS

Ainsworth, I. et al., "CAD-Based Measurement Path Planning for Free-Form Shapes Using Contact Probes", International Journal of Advanced Manufacturing Technology, Springer Verlag, London; GB, vol. 16, No. 1, XP002403064, Jan. 1, 2000, pp. 23-31.

(Continued)

*Primary Examiner* — Hyun Park
(74) *Attorney, Agent, or Firm* — Greenblum & Bernstein, P.L.C.

(57) ABSTRACT

A method is provided to assist adjustment for a movement path of a probe. A coordinate measuring machine includes a probe having a tip for detecting a surface of an object, and a movement mechanism for moving the probe, and measures a shape of the object by allowing the probe tip to scan the surface. A controller controls operation of the coordinate measuring machine by calculating a scanning path for allowing the probe tip to perform scanning movement and the movement path followed by the probe when the probe tip moves along the scanning path, setting control points on a line connecting each position of the probe tip and each corresponding position of the probe accepting a change in position of the control points by a user, and changing the movement path accordingly. A guide point allows the control points to move collectively.

2 Claims, 28 Drawing Sheets

Related U.S. Application Data

(60) Provisional application No. 61/522,431, filed on Aug. 11, 2011.

(56) References Cited

U.S. PATENT DOCUMENTS

| | | | | |
|---|---|---|---|---|
| 7,643,963 B2* | 1/2010 | Noda | ............... | G01B 5/008 |
| | | | | 702/168 |
| 7,809,523 B2* | 10/2010 | Hunter | ............... | G01B 21/04 |
| | | | | 33/503 |
| 7,971,365 B2 | 7/2011 | Hunter et al. | | |
| 8,718,975 B2* | 5/2014 | Lobato | ............... | G01B 21/04 |
| | | | | 415/161 |
| 2002/0029119 A1* | 3/2002 | Lotze | ............... | G01B 21/045 |
| | | | | 702/95 |
| 2007/0086620 A1* | 4/2007 | Arai | ............... | G01B 5/008 |
| | | | | 382/100 |
| 2007/2138730 | 9/2007 | Smith | | |
| 2009/0217426 A1* | 8/2009 | Noda | ............... | G01B 3/008 |
| | | | | 850/21 |
| 2009/0307916 A1* | 12/2009 | McLean | ............... | G01B 21/04 |
| | | | | 33/503 |
| 2011/0192042 A1 | 8/2011 | McMurtry et al. | | |
| 2011/0264402 A1 | 10/2011 | Anderson et al. | | |
| 2012/0055037 A1 | 3/2012 | Kumagai et al. | | |

FOREIGN PATENT DOCUMENTS

| | | |
|---|---|---|
| JP | 2010-537184 A | 12/2010 |
| WO | 2009/024783 A1 | 2/2009 |
| WO | WO 2009024783 A1 * 2/2009 ............. G01B 21/04 |

OTHER PUBLICATIONS

Search report from E.P.O., dated Feb. 4, 2015.
Office Action issued in Japanese family member Patent Appl. No. 2013-018237, dated Jan. 10, 2017, along with an English translation thereof.
I. Ainsworth et al., *CAD-Based Measurement Path Planning for Free-Form Shapes Using Contact Probes*, International Journal of Advanced Manufacturing Technology, Springer-Verlag, 2000, vol. 16, Issue 1, pp. 23-31.

\* cited by examiner

CMM MOVING PATH ADJUSTMENT ASSISTING METHOD AND APPARATUS

CROSS REFERENCE TO RELATED APPLICATIONS

This application is a divisional application of U.S. application Ser. No. 13/365,539, filed on Feb. 3, 2012, which claims the benefit of priority from U.S. Provisional Application No. 61/522,431, filed on Aug. 11, 2011, both disclosures of which are expressly incorporated by reference herein in their entireties.

BACKGROUND OF THE INVENTION

1. Field of the Invention

The present invention relates to a method and an apparatus for setting and adjusting a movement path of a coordinate measuring machine that measures the shape of a workpiece by scanning measurement.

2. Description of Related Art

A coordinate measuring machine that measures the shape of a workpiece by scanning measurement has been known.

FIG. 1 illustrates an exemplary configuration of a coordinate measuring system 10.

The coordinate measuring system 10 includes a coordinate measuring machine 20 and a computer terminal 40.

The coordinate measuring machine 20 includes a surface plate 21, a probe head 22, and a movement mechanism 30. A workpiece W is placed on the surface plate 21. The probe head 22 is used for scanning measurement of the workpiece W. The movement mechanism 30 allows the probe head 22 to three-dimensionally move in X, Y, and Z directions.

As illustrated in FIG. 1, an X, Y, and Z Cartesian coordinate system is set as a coordinate system of the machine for ease of illustration.

The X-direction corresponds to the horizontal direction in FIG. 1. The Y-direction corresponds to a direction into and out of the plane of FIG. 1. The Z-direction corresponds to the vertical direction in FIG. 1.

The movement mechanism 30 includes a gate-shaped frame 31, an X-slider 33, Z-axis spindle 34, and a drive mechanism (not shown).

The gate-shaped frame 31 includes a cross beam 32 which is laid in the X-axis direction. The gate-shaped frame 31 is provided movably in the Y-axis direction.

The X-slider 33 includes a column having a length in the Z-axis direction. The X-slider 33 is provided slidably in the X-axis direction along the cross beam 32.

The Z-axis spindle 34 is inserted into the X-slider 33, and is provided slidably in the Z-axis direction.

The drive mechanism (not shown) includes a motor for driving the gate-shaped frame 31, the X-slider 33, and the Z-axis spindle 34 in the respective axis directions.

Assume herein that the shape of the workpiece W with turbine blades illustrated in FIG. 2 is measured by scanning measurement, for example.

The workpiece W has a structure in which a plurality of blades WB is mounted in parallel on a side surface of a main body WM. Assume herein that scanning measurement is performed to check if the shape of each blade WB is finished in conformity with designed values.

When a user sets a section S to be measured while viewing a screen 41 of the computer terminal 40, the computer 40 works out a scanning path SR based on the designed values of the workpiece W.

A contacting sphere 27 of the probe head 22 is moved along the scanning path SR to scan coordinates with a predetermined measurement pitch.

The term "scanning path SR" herein described refers to a path along the surface of the workpiece W to be measured.

The contacting sphere 27 is moved along scanning path SR to thereby perform scanning measurement.

In order to move the contacting sphere 27 along the scanning path SR, it is necessary to appropriately move the probe head 22 according to the scanning path SR.

As illustrated in FIG. 3, a movement path MP of the probe head 22 is temporarily determined based on the scanning path SR and is displayed on the display screen 41, so that the user can confirm the movement path MP of the probe head 22 on the screen 41.

The "position of the probe head 22" corresponds to "a predetermined representative point within the probe head". Examples of such a representative point include an uppermost point (a junction point with a lowermost end of the Z-axis spindle) of the probe head 22, a rotation center of the probe head 22, and an intersection of two rotation axes to be described later. Any point may be used as the representative point as long as it can represent the position of the probe head 22.

If the probe head 22 has a rotary joint or a swing joint, a joint point (a connection point between relatively movable members) of the rotary joint or the swing joint may be set as the representative point of the probe head 22.

The movement path MP which is automatically calculated by the computer terminal 40 according to the scanning path SR of the contacting sphere 27 is not appropriate in many cases.

For example, as illustrated in FIG. 4, assume that the movement path MP of the probe head 22 is generated so that the probe head 22 is positioned in the simplest manner in a direction perpendicular to the section S to be measured. In this case, a stylus 26 maintains a posture parallel with the Z-axis. As a result, the stylus 26 collides with the blades WB. Now, attention is turned to a region 900 which is surrounded by a dashed line in FIG. 4.

To avoid the collision mentioned above, when the stylus 26 is laid down to be in parallel with an XY plane, the stylus 26 and the probe head 22 may collide with a neighboring blade.

Accordingly, it is necessary for the user to make an adjustment so as to obtain an appropriate movement path for the probe head 22.

SUMMARY OF THE INVENTION

Herein, control points CP are prepared to facilitate the adjustment.

The control points CP are set on a line connecting each position of the contacting sphere 27 on the scanning path SR and each position of the probe head 22 corresponding to each position of the contacting sphere 27.

The position of the probe head 22 can be changed by moving the position of each control point CP.

Not only the position of the probe head 22, but also the posture of the stylus 26 can be adjusted by changing the position of the probe head 22.

As a result, an optimum movement path MP for the probe head 22 can be generated so as to prevent the stylus 26 and the probe head 22 from interfering with the workpiece W upon measurement and to minimize a movement amount and an operation amount (a rotation operation or the like) of the probe head 22, for example.

In order to move the position of each control point CP, the control point CP whose position to be changed is selected by moving a mouse cursor while viewing the display screen 41.

Then, coordinate values indicating the position to be changed are input by pressing keys on the display screen 41, to thereby change the position of each control point CP (see FIG. 5).

Each control point (control point) CP contains information for controlling the measurement operation, such as coordinates of each measurement point on a workpiece, a normal line for a workpiece surface at each measurement point, a stylus posture for approaching each measurement point, a scan speed, and a measurement pitch.

The host computer 40 controls the operation of the coordinate measuring machine 20 using the information associated with the control points CP.

Each control point CP is displayed on the display screen 41, and the position of each control point CP can be manually changed by the user. This enables adjustment of an optimum movement path MP for measurement.

However, the operation of manually inputting each coordinate position and moving the control points CP one by one is troublesome. Furthermore, when the coordinate positions of each control points CP are manually inputted one by one, the movement path MP is formed into a zigzag shape, which makes it difficult for the probe to move smoothly.

Under such circumstances, considerable time and labor have been required for measurement of the workpiece shape.

A first exemplary aspect of the present invention is a CMM moving path adjustment assisting method that assists adjustment for a movement path of a probe in a coordinate measuring system, the coordinate measuring system including: a coordinate measuring machine that includes the probe having a probe tip at a tip thereof for detecting a surface of an object to be measured, and a movement mechanism for moving the probe, and measures a shape of the object to be measured by allowing the probe tip to scan the surface of the object to be measured; and a controller that controls operation of the coordinate measuring machine, the method including: calculating, by the controller, a scanning path for allowing the probe tip to perform scanning movement along the surface of the object to be measured; calculating, by the controller, the movement path followed by the probe when the probe tip moves along the scanning path; setting, by the controller, control points on a line connecting each position of the probe tip on the scanning path and each position of the probe corresponding to each position of the probe tip; and accepting, by the controller, a change in position of the control points by a user, and changing the movement path according to the change in position of the control points. Further, the controller provides adjustment guide means for allowing a plurality of control points to move collectively.

Further, upon accepting a drag operation by a user to point a mouse cursor to each control point on a display screen, the controller changes a position of each control point subjected to the drag operation to a position designated by the drag operation.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
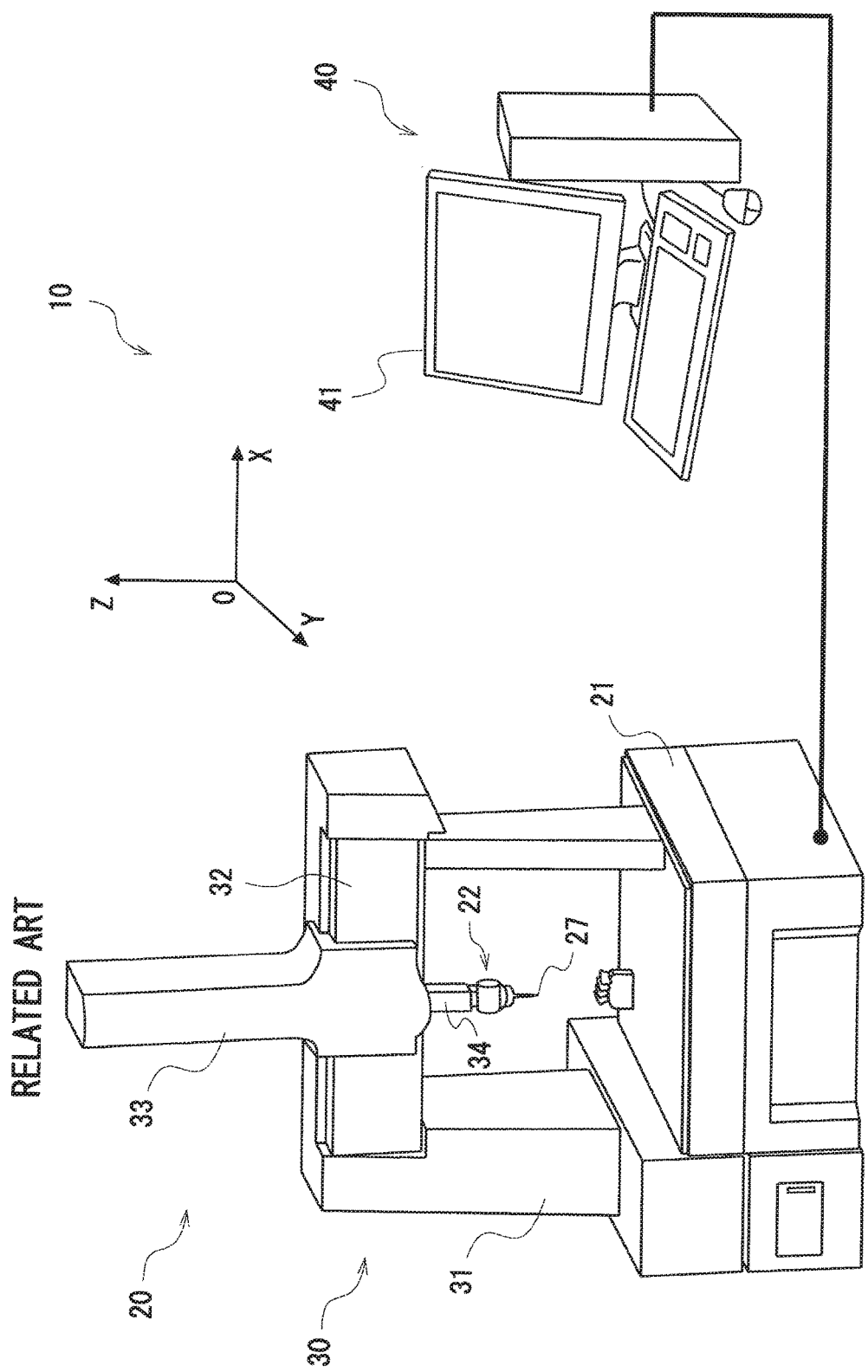
FIG. 1 is a diagram illustrating an exemplary configuration of a coordinate measuring system.

Hereinafter, embodiments of the present invention are illustrated and described with reference to reference symbols given to the constituent elements in the drawings.

First Embodiment

A first embodiment of the present invention will be described.

In the present invention, a coordinate measuring machine performs scanning measurement to measure the shape of a workpiece. The structure of the coordinate measuring machine itself has been conventionally known. The present invention can be applied to a coordinate measuring machine 20 described in the "BACKGROUND OF THE INVENTION" section, and also to other well-known three-dimensional coordinate measuring machines.

Figure 6:
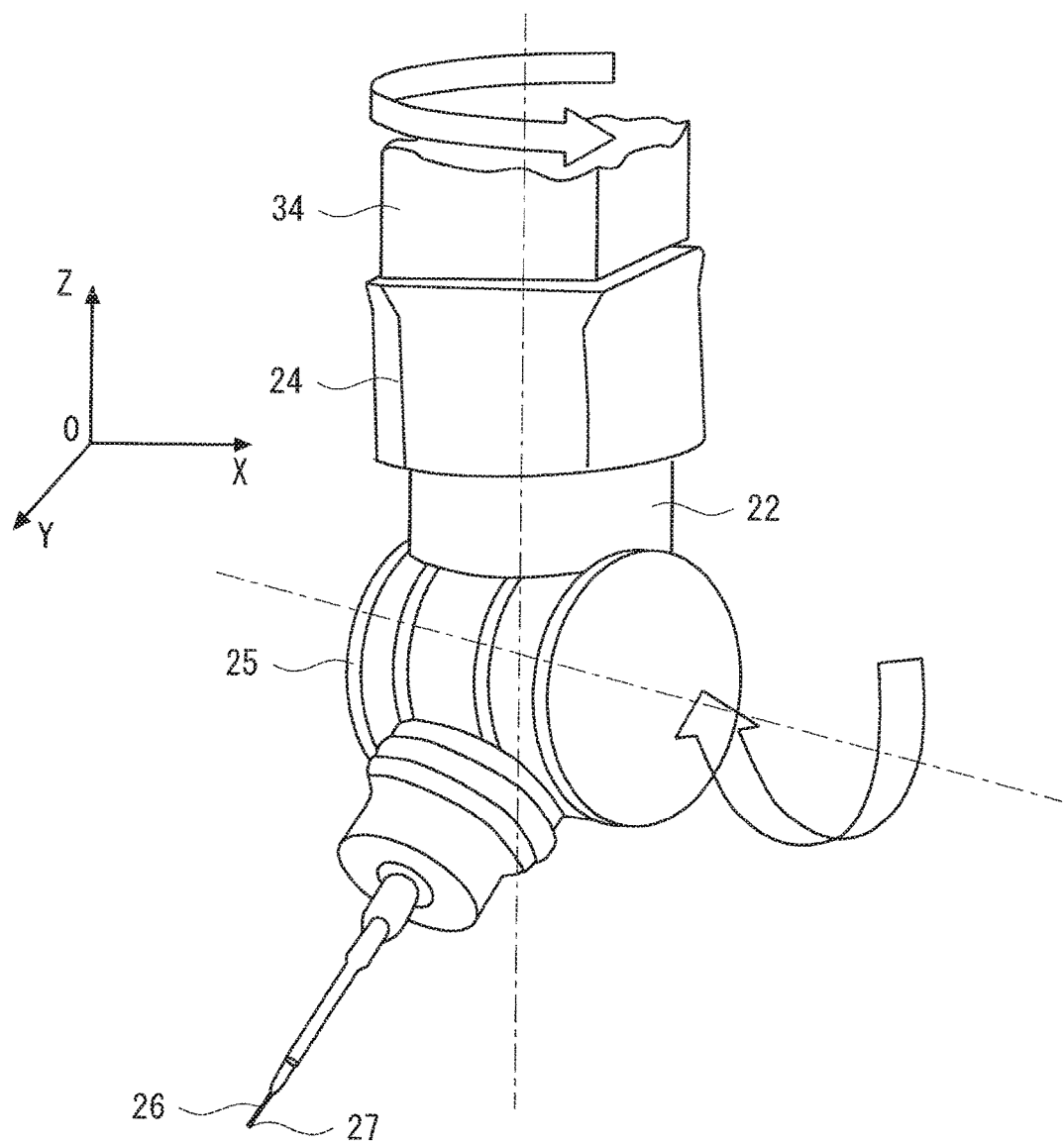
FIG. 6 is an enlarged view of the probe head.

Referring next to FIG. 6, a probe head 22 will be described.

The probe head 22 is mounted at a lower end of the Z-axis spindle 34. The probe head 22 includes a rotary joint 24, a swing joint 25, and a stylus 26. An upper movable portion of the rotary joint 24 is mounted at a lower end of the Z-axis spindle 34, and a lower movable portion of the rotary joint 24 is mounted on the swing joint 25.

Herein the rotary joint 24 rotates about an axis parallel with the Z-axis. The swing joint 25 is swingable about an axis perpendicular to the Z-axis.

The stylus 26 is supported at a lower end of the swing joint 25.

A contacting sphere 27 is provided at a tip of the stylus 26.

Each of the rotary joint 24 and the swing joint 25 is driven by a motor.

Accordingly, the coordinate measuring machine 20 allows the contacting sphere 27 to move in five axis directions, i.e., the X-axis direction, the Y-axis direction, the Z-axis direction, a direction about the Z-axis, and a direction about an axis perpendicular to the Z-axis.

Thus, the coordinate measuring machine 20 has a function for allowing the contacting sphere 27 to move in five axis directions. This makes it possible to approach any workpiece surface by controlling both the rotary joint 24 and the swing joint 25 to be rotationally driven simultaneously, without the need for replacing the probe head 22 or changing a workpiece posture even when the workpiece has a complex shape. Consequently, the measurement efficiency can be drastically improved.

A feature of this embodiment is to provide adjustment guide means for appropriately moving each control point CP with a simple and quick manipulation upon manual adjustment to appropriately adjust a movement path MP of the probe head 22.

Hereinafter, the adjustment guide means will be described using a specific measurement example.

The workpiece described in the "BACKGROUND OF THE INVENTION" section is used as a workpiece W to be measured according to this embodiment. Specifically, as illustrated in FIG. 2, scanning measurement is performed on contour shapes of blades WB which are mounted on a side surface of a main body WM in parallel.

Figure 2:
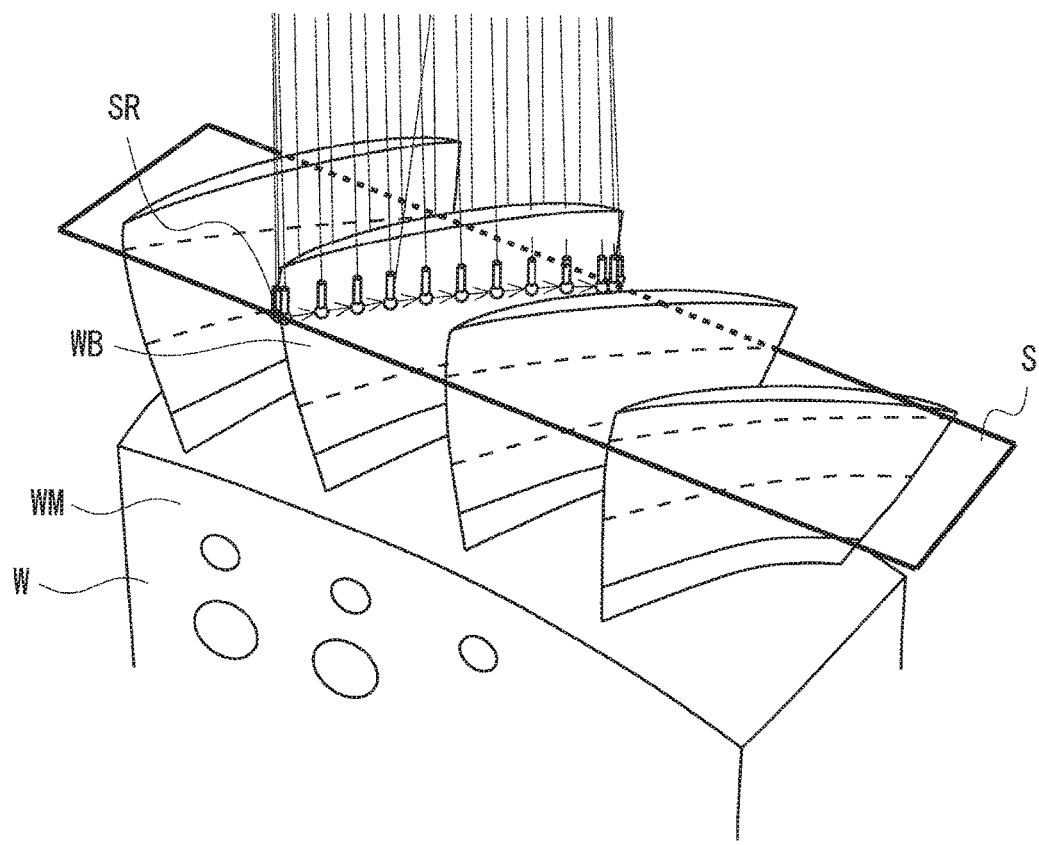
FIG. 2 is an enlarged view of an object to be measured.
Figure 3:
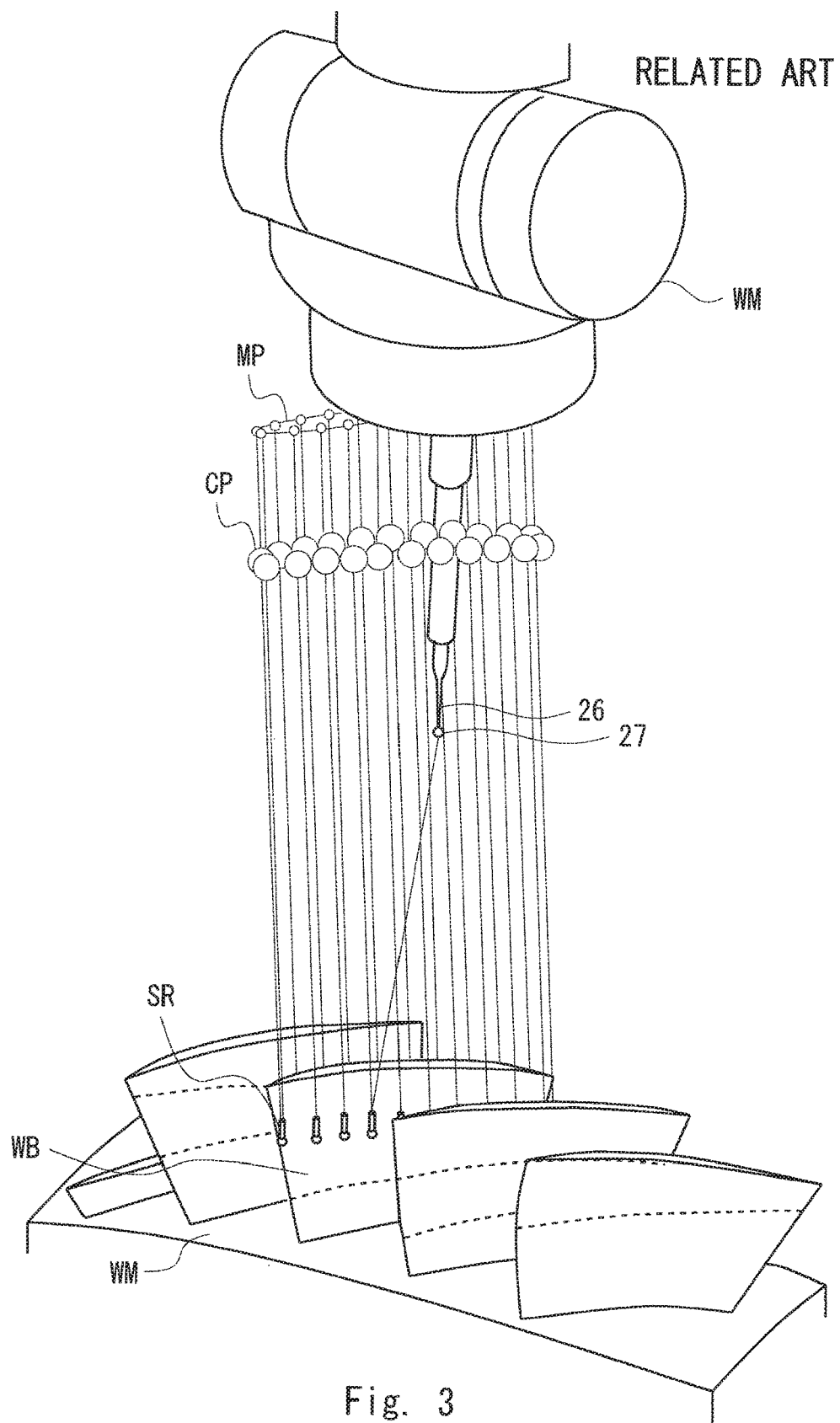
FIG. 3 illustrates a scanning path SR and a movement path MP of a probe head 22 corresponding to the scanning path SR.

As illustrated in FIG. 2, a contour to be measured is designated by setting a section S to be measured.

Further, measurement conditions are set.

Figure 7:
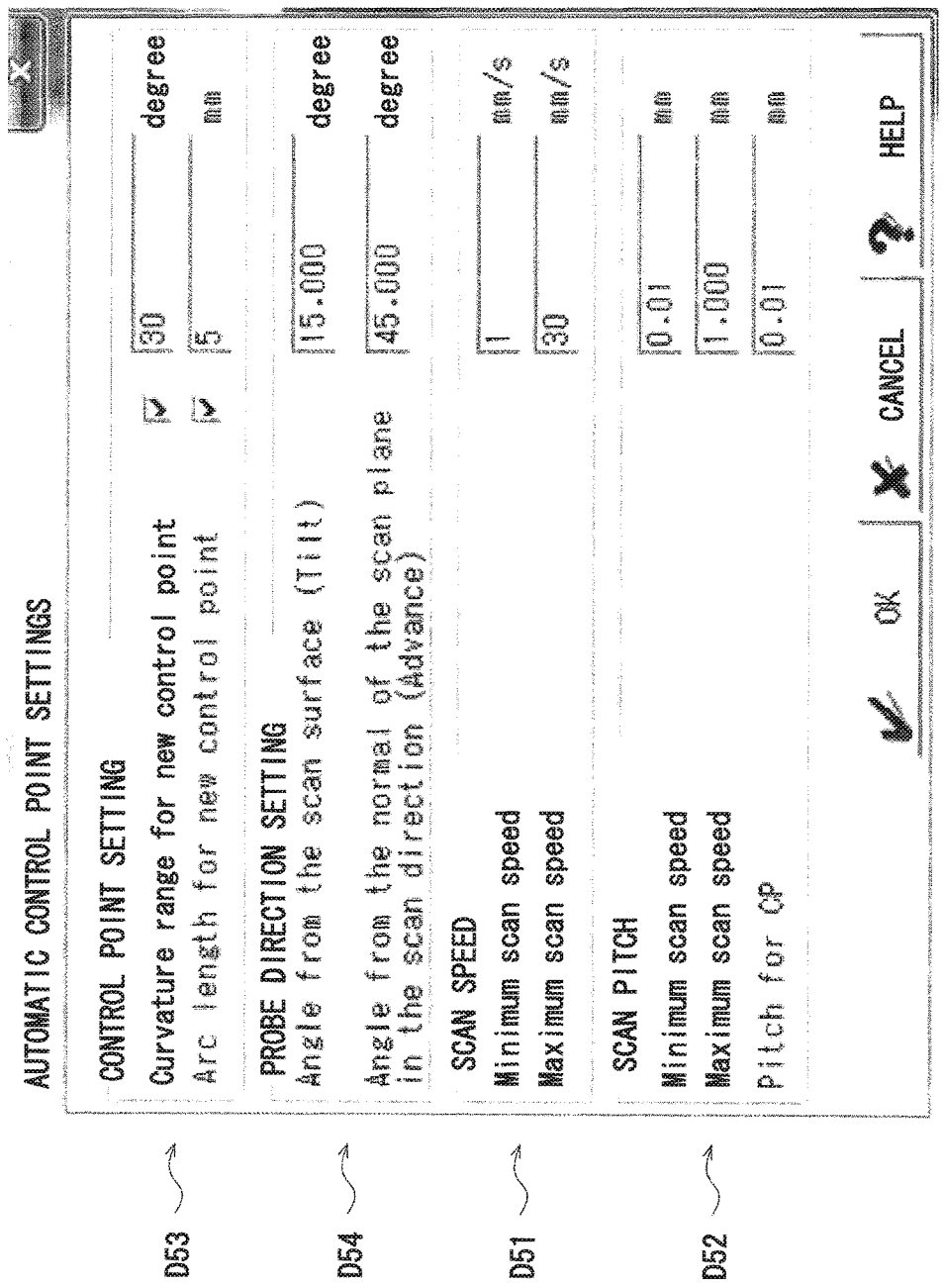
FIG. 7 illustrates an example of a screen for setting measurement conditions.

FIG. 7 illustrates an example of a screen for setting measurement conditions.

As illustrated in FIG. 7, a scan speed (D51) and a scan pitch (D52) are set.

The term "scan pitch (D52)" refers to a degree of fineness of measurement point sampling on a workpiece surface.

Further, the fineness of setting for control points CP is set (D53).

This embodiment illustrates a configuration example in which the control points CP are generated every time the curvature of a scanning path SR of the contacting sphere 27 reaches 30 degrees, or every 5 mm along the scanning path SR of the contacting sphere 27.

FIG. 7 includes a field (D54) for setting a probe head direction. In this field, an angle of the probe to approach a workpiece surface can be set, for example.

Figure 8:
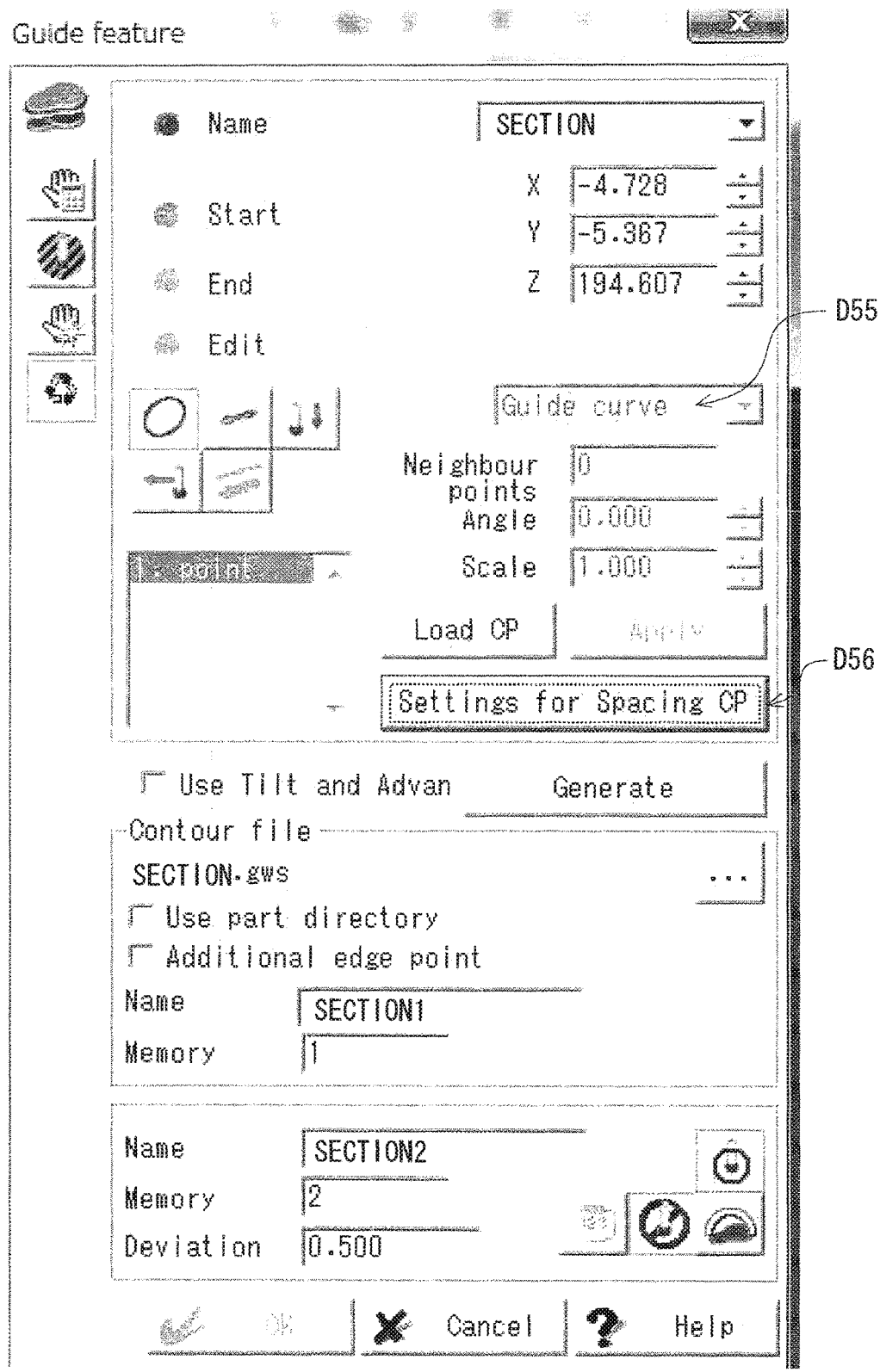
FIG. 8 illustrates an example of a screen for setting adjustment guide means.

FIG. 8 illustrates an example of a screen for setting the adjustment guide means.

This embodiment illustrates an example in which "Guide curve" is selected as the adjustment guide means (D55).

In this embodiment, since the contour shape of the outer surface of the workpiece is measured, the guide curve GC is suitably used as the adjustment guide means.

In addition to the guide curve, a guide point GP and a guide line GL, which will be described later by way of other embodiments, are also prepared as examples of the adjustment guide means.

In addition, necessary conditions, such as a data sampling pitch, are set.

After the settings as described above, "Settings for Spacing CP" button is clicked (D56).

Figure 9:
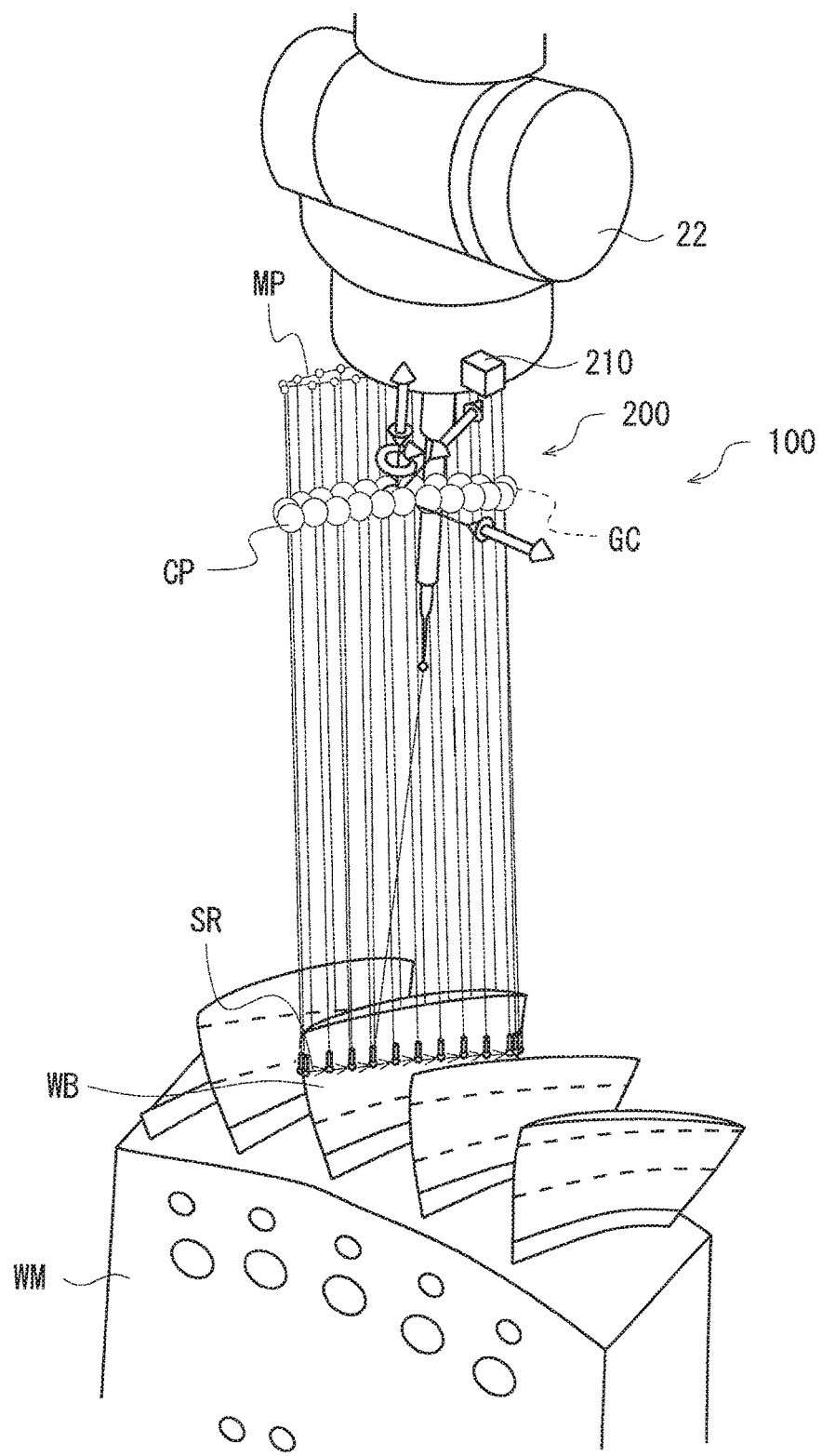
FIG. 9 illustrates a scanning path SR of a contacting sphere, a movement path MP of a probe head corresponding to the scanning path SR, and a layout of control points CP corresponding to the scanning path SR and the movement path MP.

As a result, as illustrated in FIG. 9, the scanning path SR of the contacting sphere 27 and the movement path MP of the probe head 22 corresponding to the scanning path SR are generated, and the control points CP corresponding to the scanning path SR and the movement path MP are further generated to be arranged.

As described in the "BACKGROUND OF THE INVENTION" section, the control points CP are set on a line connecting each position of the contacting sphere 27 on the scanning path SR and each position of the probe head 22 corresponding to each position of the contacting sphere 27.

Further, as illustrated in 4, the stylus 26 collides with the blades WB if the movement path MP automatically calculated by a host computer 40 is not appropriate, and it is necessary for a user to perform an adjustment operation to move each control point CP so that the movement path MP of the probe head 22 can be appropriately set.

In this embodiment, the guide curve GC serving as adjustment guide means 100 and guide operation means (3D Handle) 200 for operating the guide curve GC are prepared to facilitate the operation for adjusting the position of each control point upon execution of the adjustment operation for the user to move each control point CP.

Figure 10:
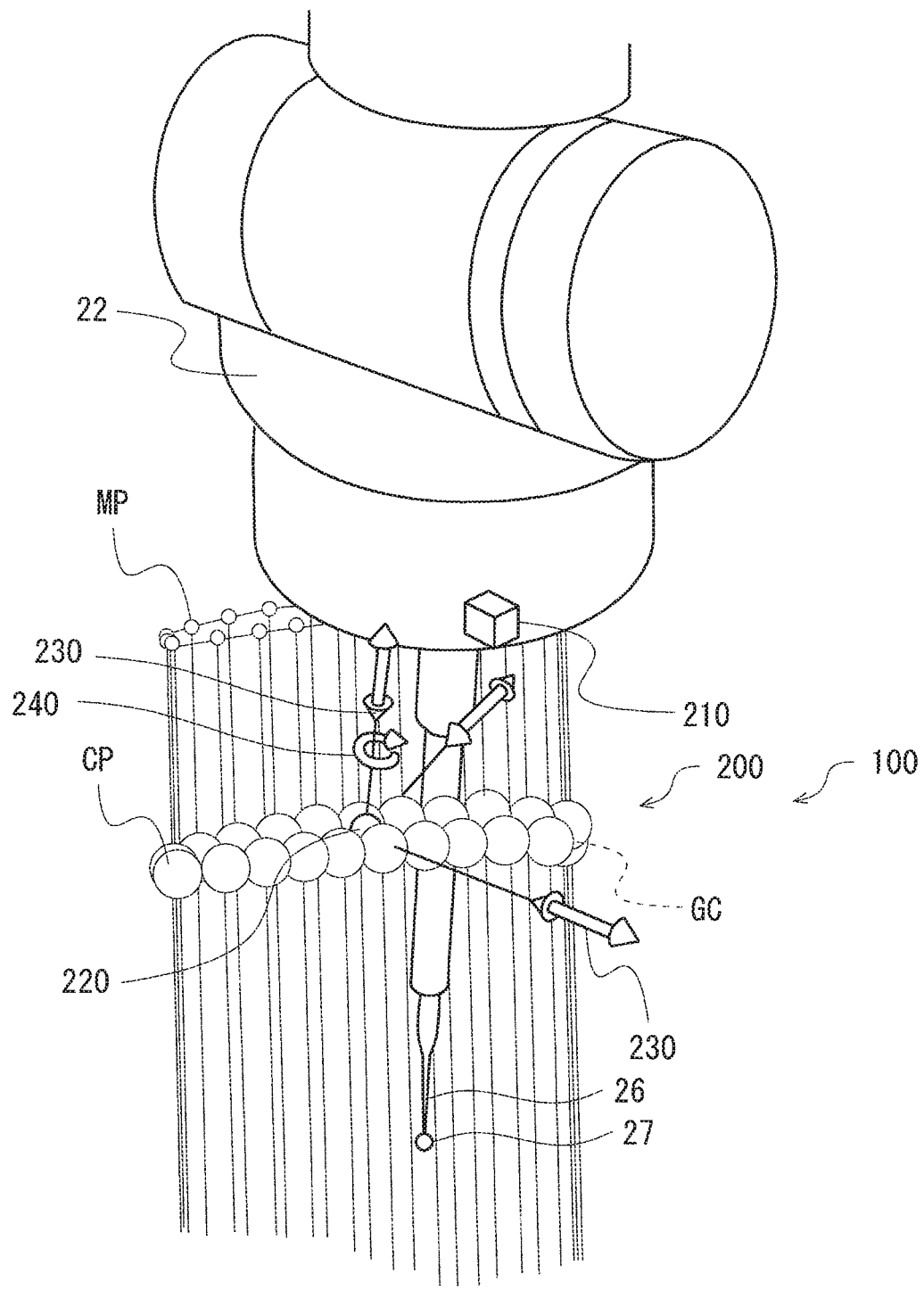
FIG. 10 is an enlarged view illustrating a periphery of the control points CP and guide operation means.

FIG. 10 is an enlarged view illustrating a periphery of the control points CP and guide operation means 100.

The guide curve GC is a curve obtained by smoothing all the control points CP, and all the control points CP are set on the guide curve GC.

Accordingly, the control points CP are collectively moved together with the guide curve GC by scaling the "guide curve GC" with respect to the center of the guide curve GC.

Figure 11:
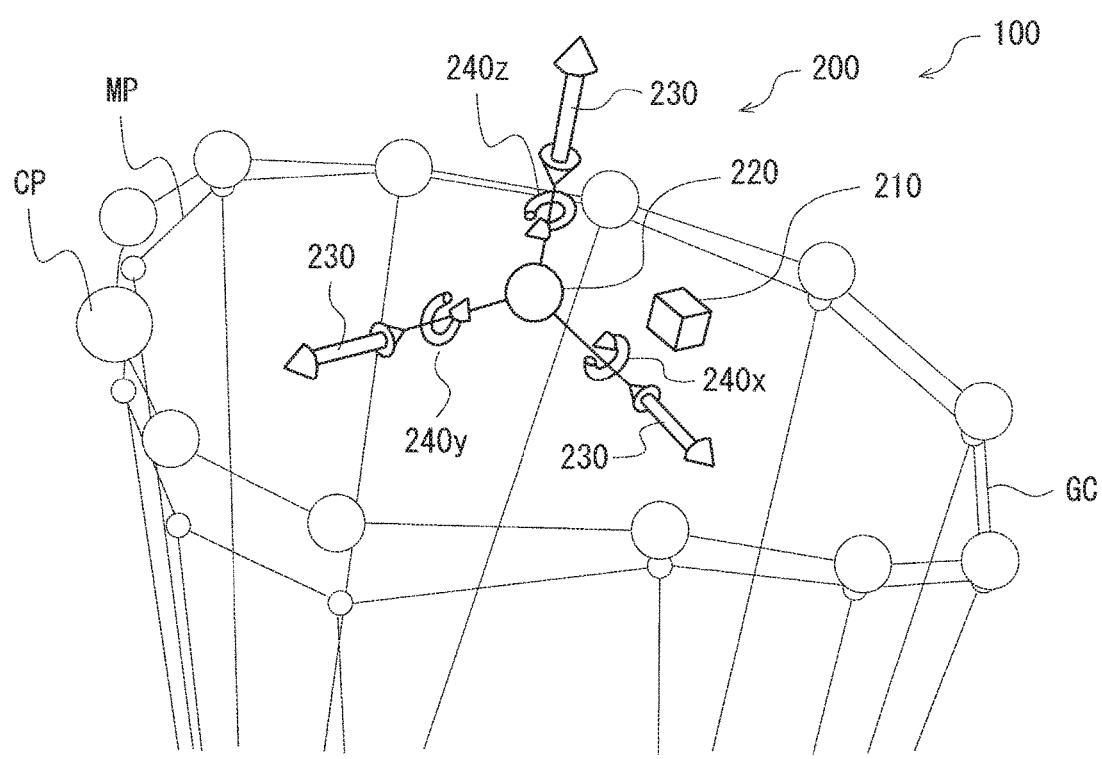
FIG. 11 is another enlarged view illustrating a periphery of the control points CP and the guide operation means.

All the control points CP set on one guide curve GC are typically formed on a single plane depending on the contour of the workpiece W to be measured or the scanning path SR. Accordingly, all the control points need not be formed on a single plane as illustrated in FIG. 11.

The guide curve GC typically has an oval or circular shape depending on the contour of the workpiece W to be measured and the scanning path SR, but the shape of the guide curve GC is not limited to an oval or circular shape.

The guide curve GC may be a curve that connects the control points CP in a ring shape, but the shape of the curve is not limited to a closed annular shape. Alternatively, a single continuous curve having an opened shape may be used.

The guide operation means (3D Handle) 200 is provided with a scale box 210, a drag ball 220, a drag axis 230, and a rotating ring 240.

The scale box 210 is an operation icon for scaling up and down the guide curve GC with respect to the center of the guide curve GC.

For example, when the scale box 210 is operated to be scaled up on the display screen, the guide curve GC is also expanded accordingly.

Further, when the scale box 210 is operated to be scaled down, the guide curve GC is reduced accordingly.

The operation for scaling up and down the scale box 210 can be performed by any method, as long as the operation can be carried out without giving a sense of discomfort to the user.

For example, an operation method may be set in which the scale box 210 is scaled down by a drag operation to move an angle toward the center of the scale box 210 in the state where the mouse cursor is pointed to the angle of the scale box 210.

Figure 12:
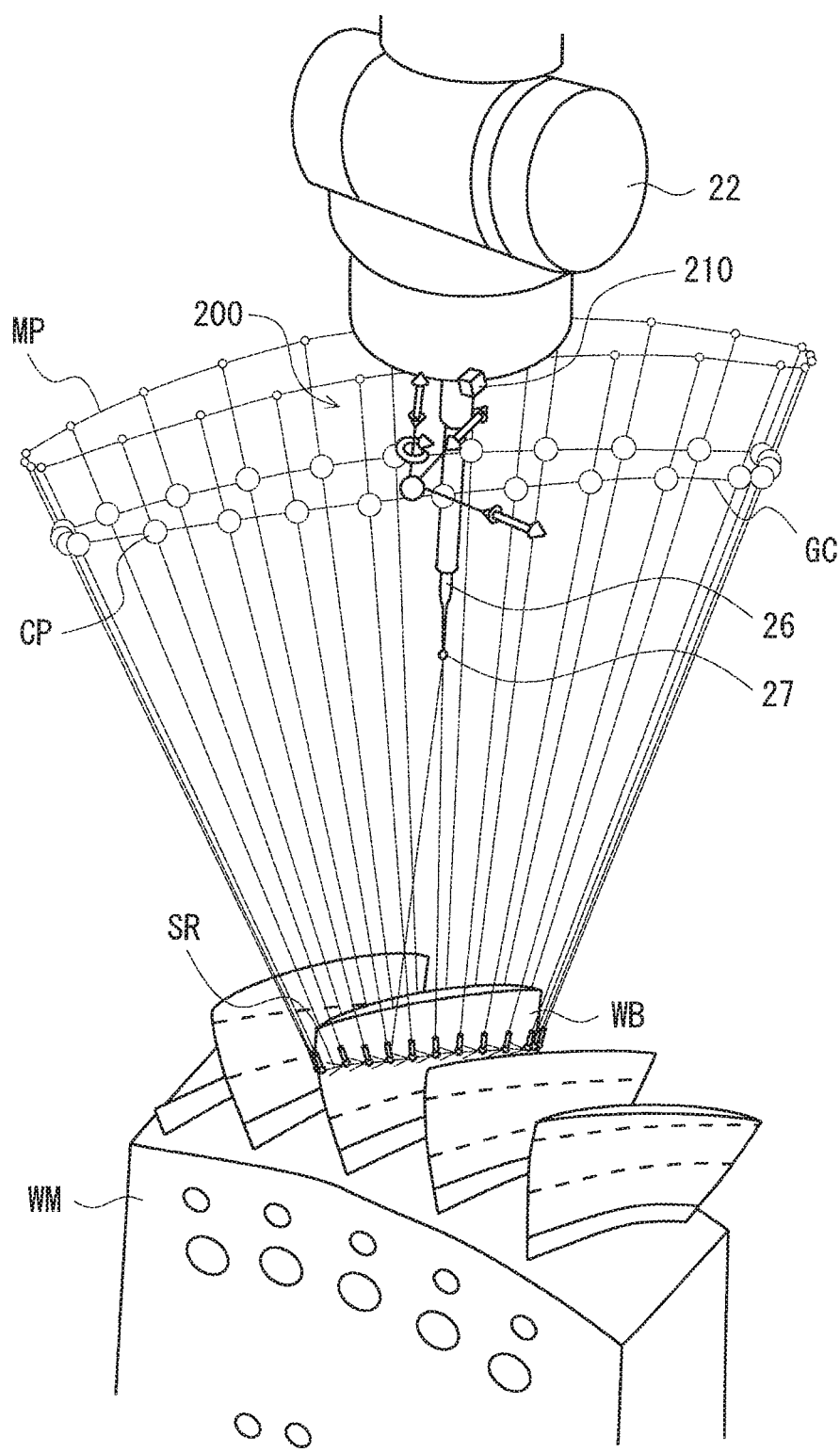
FIG. 12 illustrates a state where a guide curve GC is expanded.

When the guide curve GC is expanded using the scale box from the state illustrated in FIG. 10, the state illustrated in FIG. 12 is obtained, for example.

Along with the expansion of the guide curve GC, all the control points CP are moved.

Figure 4:
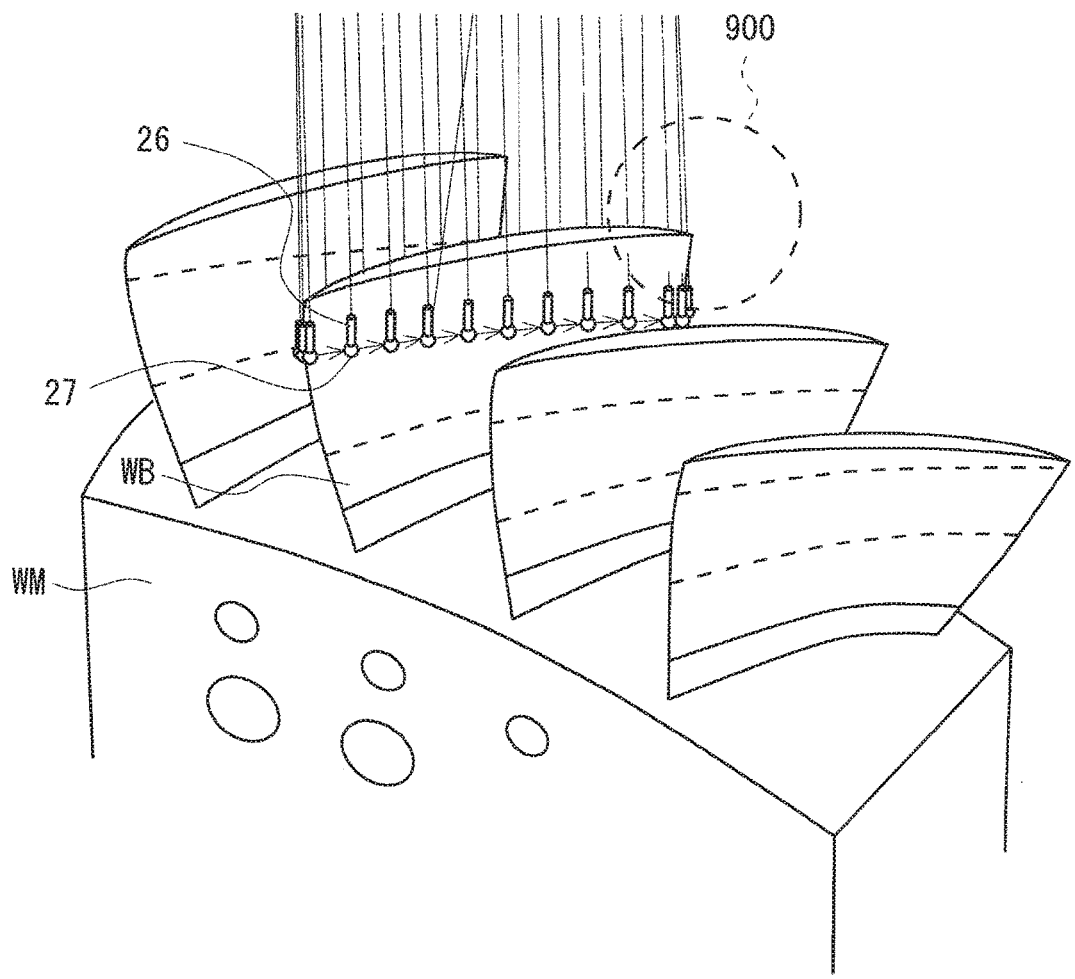
FIG. 4 is a partial enlarged view of FIG. 3.
Figure 5:
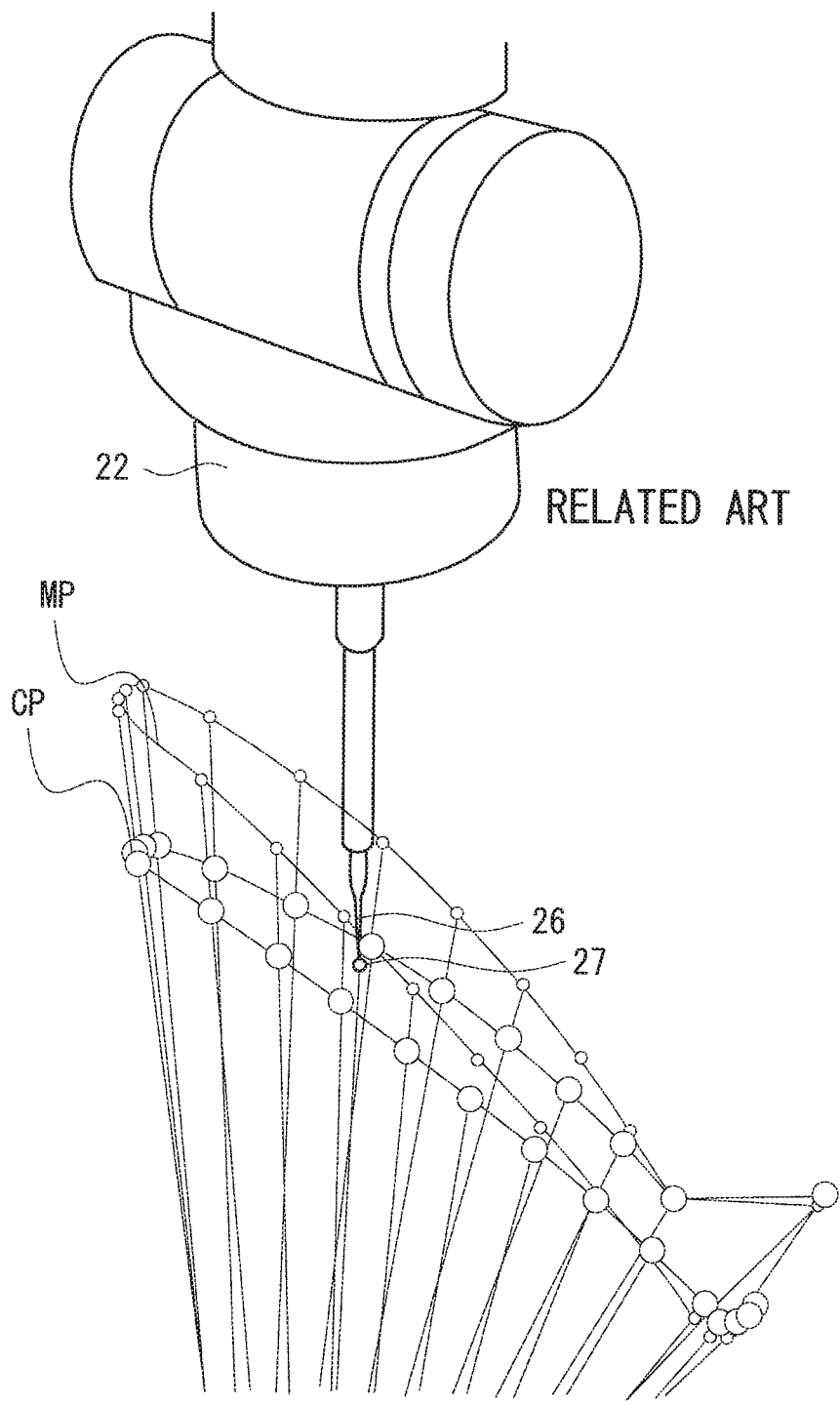
FIG. 5 illustrates a state where positions of control points CP are changed.

Referring to FIG. 10, the stylus 26 is constantly parallel with the Z-axis, so that the stylus 26 collides with the workpiece W (see FIG. 4). Referring to FIG. 12, the movement path MP of the probe head 22 is larger than the scanning path SR. Thus, the stylus 26 approaches each measurement point at a slightly oblique angle.

Figure 13:
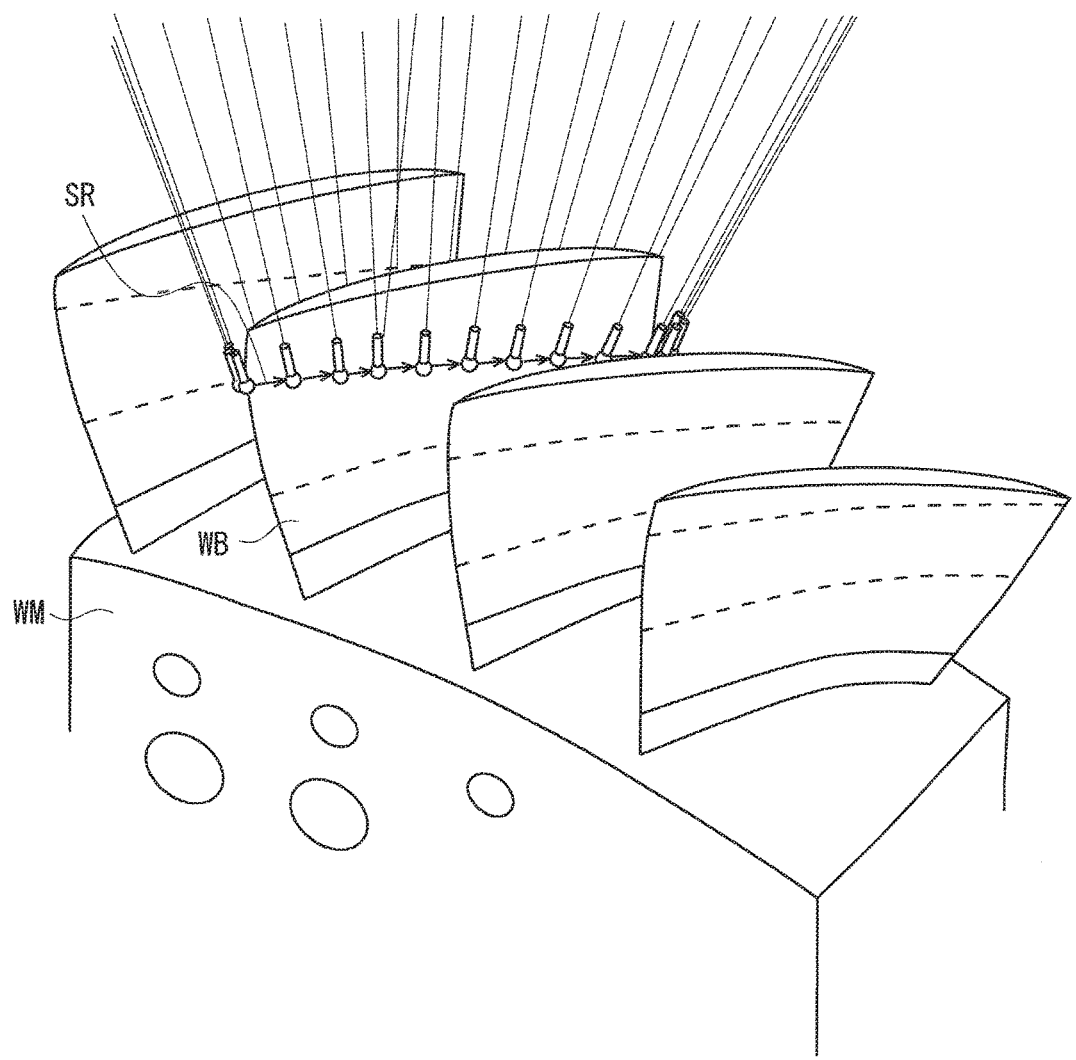
FIG. 13 is an enlarged view illustrating a vicinity of a scanning path.

This adjustment avoids interference between the stylus 26 and the workpiece W as illustrated in the enlarged view of FIG. 13.

Conventionally, it is necessary to adjust the movement path MP of the probe head 22 by manually inputting each position of control points to be moved.

In this embodiment, only a simple operation of slightly expanding the guide curve GC using the scale box 210 allows the positions of all control points to be appropriately moved at the same time. Since all the control points CP are set on the guide curve GC, all the control points CP are set on a single smooth curve. Accordingly, the movement path MP of the probe head 22 is also smooth, so that the smooth and optimum movement path MP of the probe head 22 can be obtained without a slight adjustment of the position of each control point CP.

The drag ball 220 is an operation icon for moving the guide curve. The drag ball 220 allows the guide curve GC to move in any direction in a three-dimensional space.

The drag ball 220 may be located at the center of the guide curve GC, for example, on the display screen 41.

As is obvious from FIG. 11, the drag ball 220 is disposed at a position corresponding to a substantial center of the guide curve GC, though this may be somewhat difficult to see in FIG. 10 in which the control points overlap each other.

The drag ball 220 is movable in parallel with the X-axis, Y-axis, or Z-axis, and is also movable to a midpoint between the X-axis and the Y-axis, for example, irrespective of the axis directions of the coordinate system.

The drag axis 230 is an operation icon for moving the guide curve GC in the X-axis direction, Y-axis direction, or Z-axis direction.

The drag axis 230 is provided with an X-axis direction arrow 230x, a Y-axis direction arrow 230y, and a Z-axis direction arrow 230z.

For example, when the X-axis direction arrow 230x is selected and dragged by the mouse cursor, the guide curve GC can be moved in the direction along the X-axis.

The X-axis, Y-axis, and Z-axis directions herein described are defined in a workpiece coordinate system, for example. Alternatively, a machine coordinate system may be used, and thus the user may select one of these systems.

Figure 14:
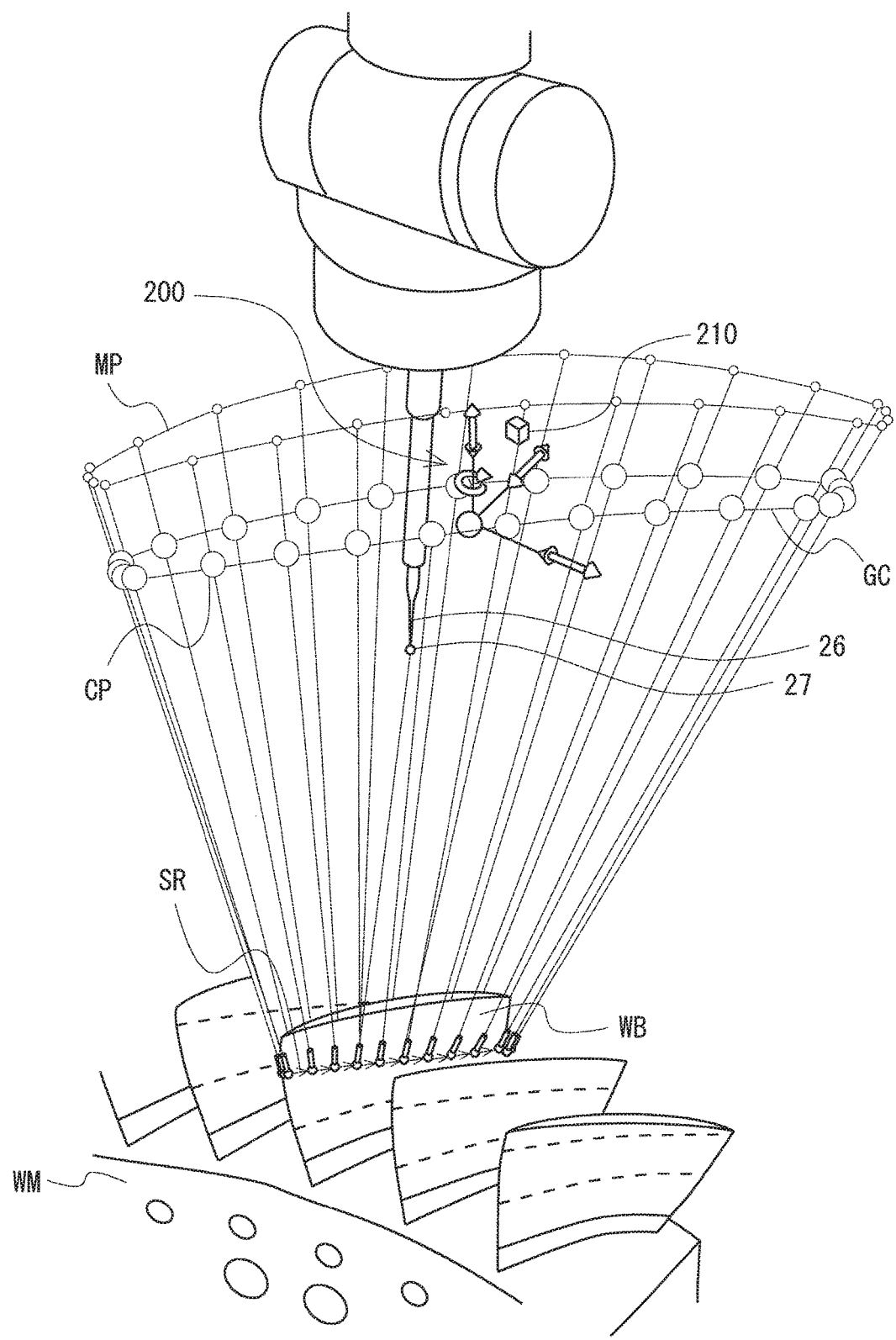
FIG. 14 illustrates a state where the guide curve GC is moved in an X-axis direction.

When the guide curve GC is moved in the X-axis direction using the drag ball 220 or the X-axis direction arrow 230x from the state illustrated in FIG. 12, the state illustrated in FIG. 14 is obtained, for example.

A position where the stylus 25 does not interfere with the neighboring blade WB may be determined by shifting the position of the guide curve GC to right or left.

Also in this case, all the control points CP are simultaneously moved along with the movement of the guide curve GC, so that the operation is extremely simplified.

The rotating ring 240 is an operation icon for rotationally moving the guide curve GC. Examples of the rotation operation include a rotation about the X-axis, a rotation about the Y-axis, and a rotation about the Z-axis. Accordingly, as illustrated in FIG. 11, an X-axis rotation icon 240x, a Y-axis rotation icon 240y, and a Z-axis rotation icon 240z may be provided around the respective axes. Alternatively, when only a rotation about the Z-axis is allowed, for example, due to the limitations of the scanning path SR and the movement path MP, only the Z-axis rotation icon 240z may be displayed as illustrated in FIG. 12.

Figure 15:
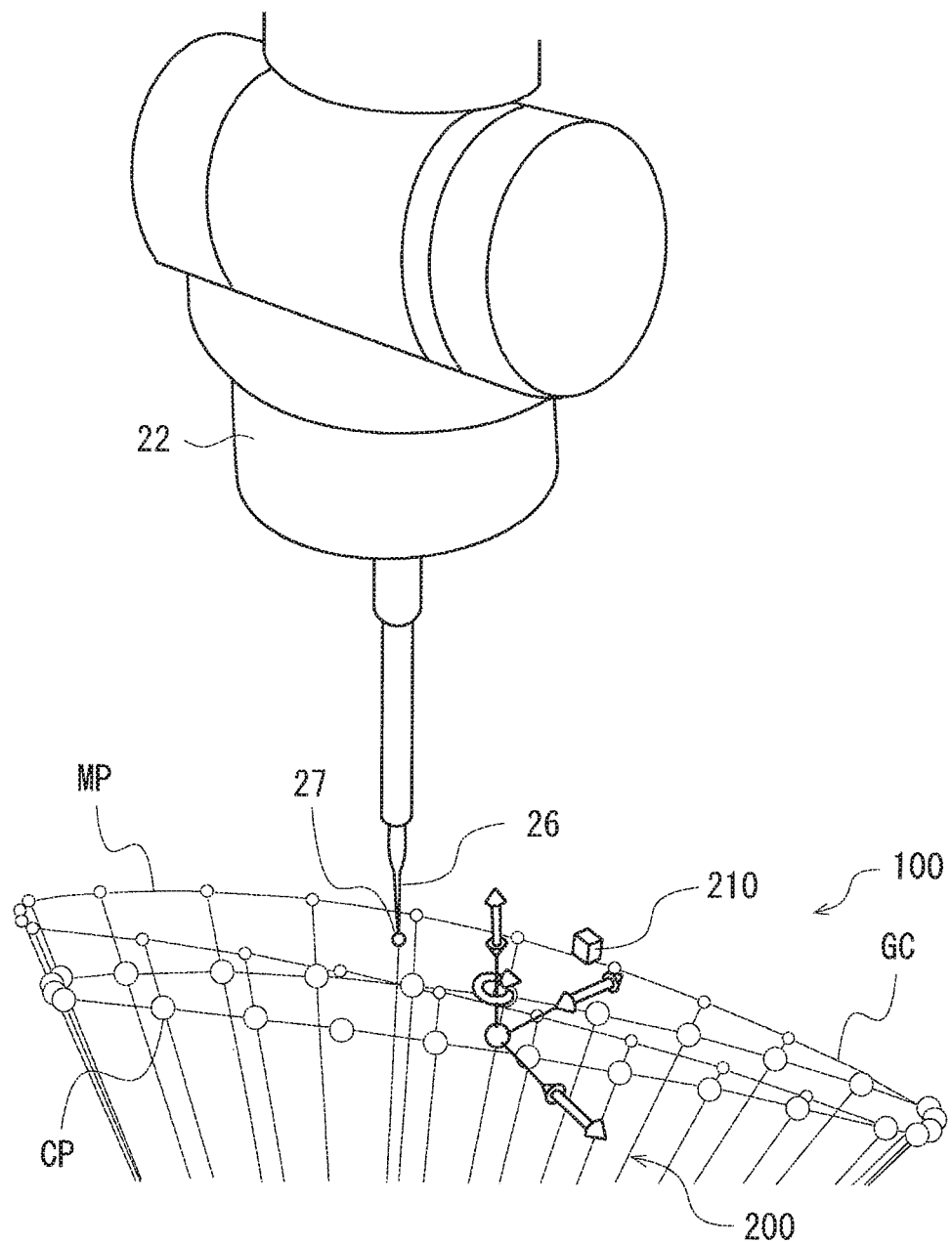
FIG. 15 illustrates a state where the guide curve GC is rotated about a Z-axis.

When the guide curve GC is rotated about the Z-axis from the state illustrated in FIG. 12 by using the Z-axis rotation icon 240z, the state illustrated in FIG. 15 is obtained, for example.

Also in this case, all the control points CP are simultaneously moved along with the movement of the guide curve GC, so that the operation is extremely simplified.

In the operation examples described above, the operation for allowing all the control points to be moved simultaneously using the guide operation means (3D Handle) 200 has been described.

Herein, the positions of the control points CP may be individually moved to make a final slight adjustment.

Figure 16:
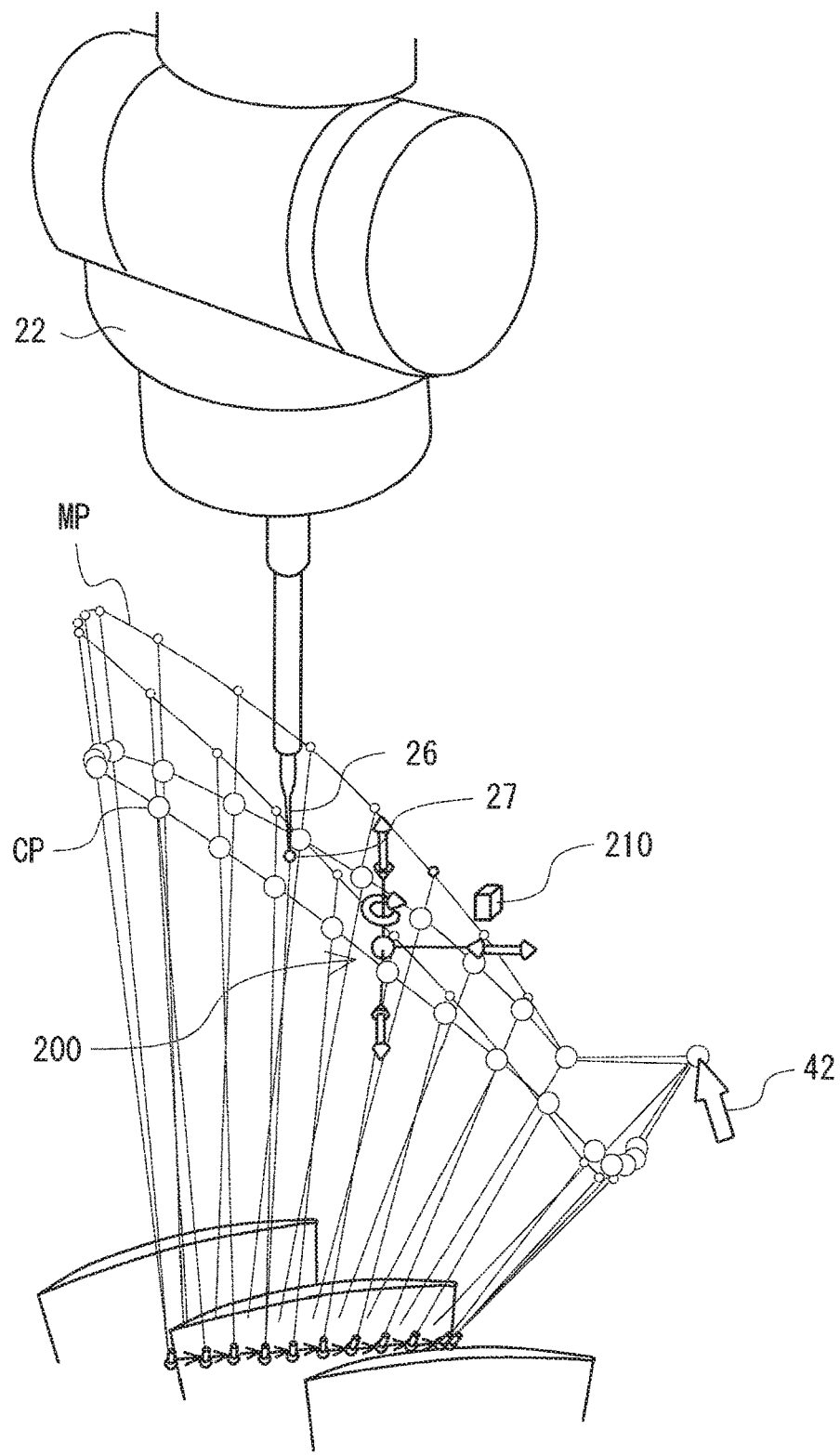
FIG. 16 illustrates a state where the control points CP are moved by a drag operation of a mouse cursor.

In this embodiment, upon movement of the respective positions of the control points CP, each control point CP can be moved to a desired position on the display screen by selecting and dragging the control point CP by the mouse cursor 42 as illustrated in FIG. 16.

An operation (GUI) using such a pointing device is more intuitive and simpler than a conventional command-based operation such as an input of coordinates. This contributes to simplification and improvement in efficiency of a measurement operation.

Modified Example

Although the above embodiment illustrates a guide curve that connects all control points, the guide curve need not connect all control points. Alternatively, a virtual curve that smoothly connects three or more control points selected by a user, for example, may be used as a guide curve.

In this case, assuming that the user selects and drags one of the control points connected by the guide curve, non-selected control points are also moved so that the control points are connected by a smooth curve such as a spline curve. This simplifies the adjustment of the movement path, and allows the user to selectively adjust only desired control points.

Second Embodiment

Next, a second embodiment of the present invention will be described.

While the basic structure of the second embodiment is the same as that of the first embodiment, a guide point will be described in the second embodiment as an example of the adjustment guide means.

Since the first embodiment illustrates measurement of a contour shape of a workpiece outer surface, a guide curve is suitably used as the adjustment guide means.

Figure 17:
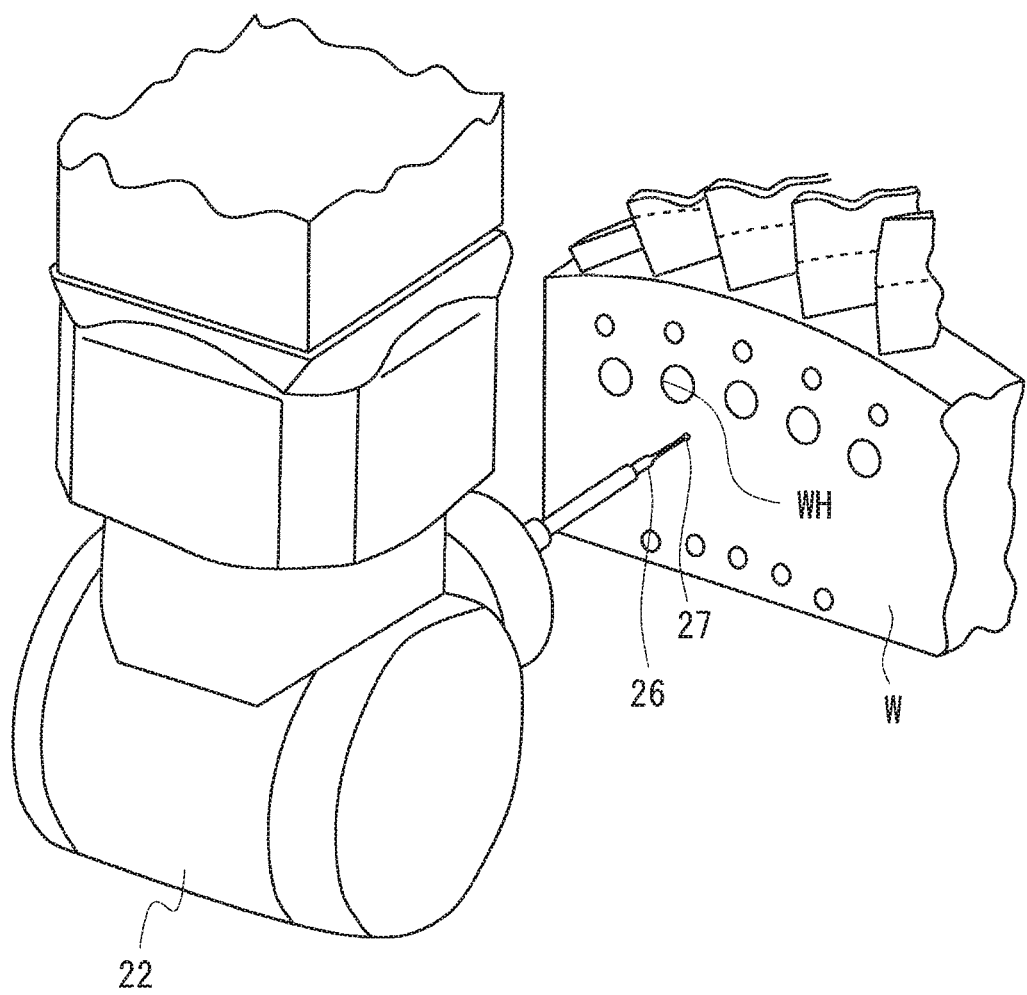
FIG. 17 illustrates a workpiece with holes.

Herein, in the case where an inner diameter of each hole WH in the workpiece W is measured as illustrated in FIG. 17, for example, a guide point is used as the guide adjustment means.

The inner diameter of each hole illustrated in FIG. 17 is designated as a measurement target.

Figure 18:
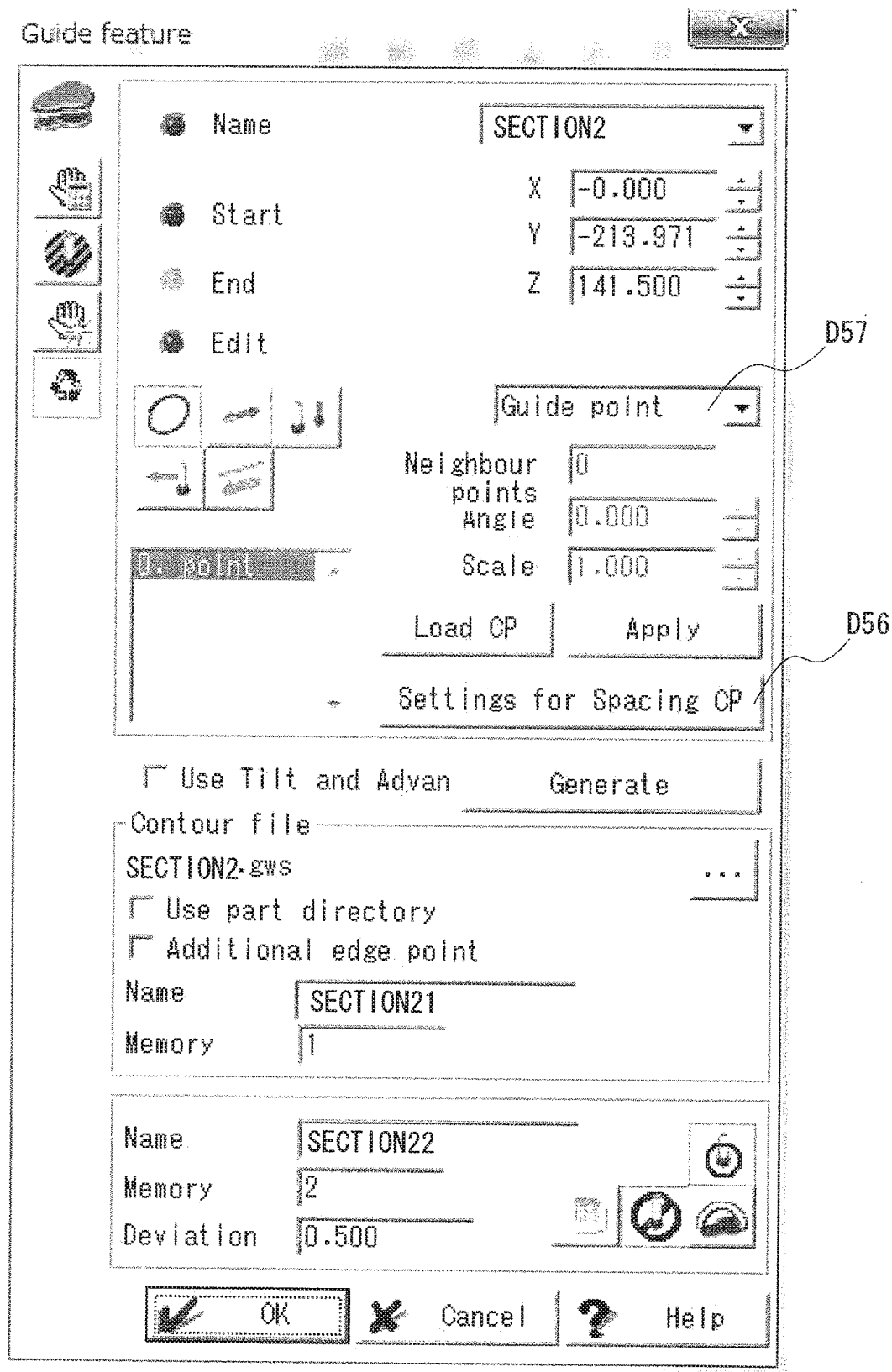
FIG. 18 illustrates an example of a screen for setting the adjustment guide means.
Figure 19:
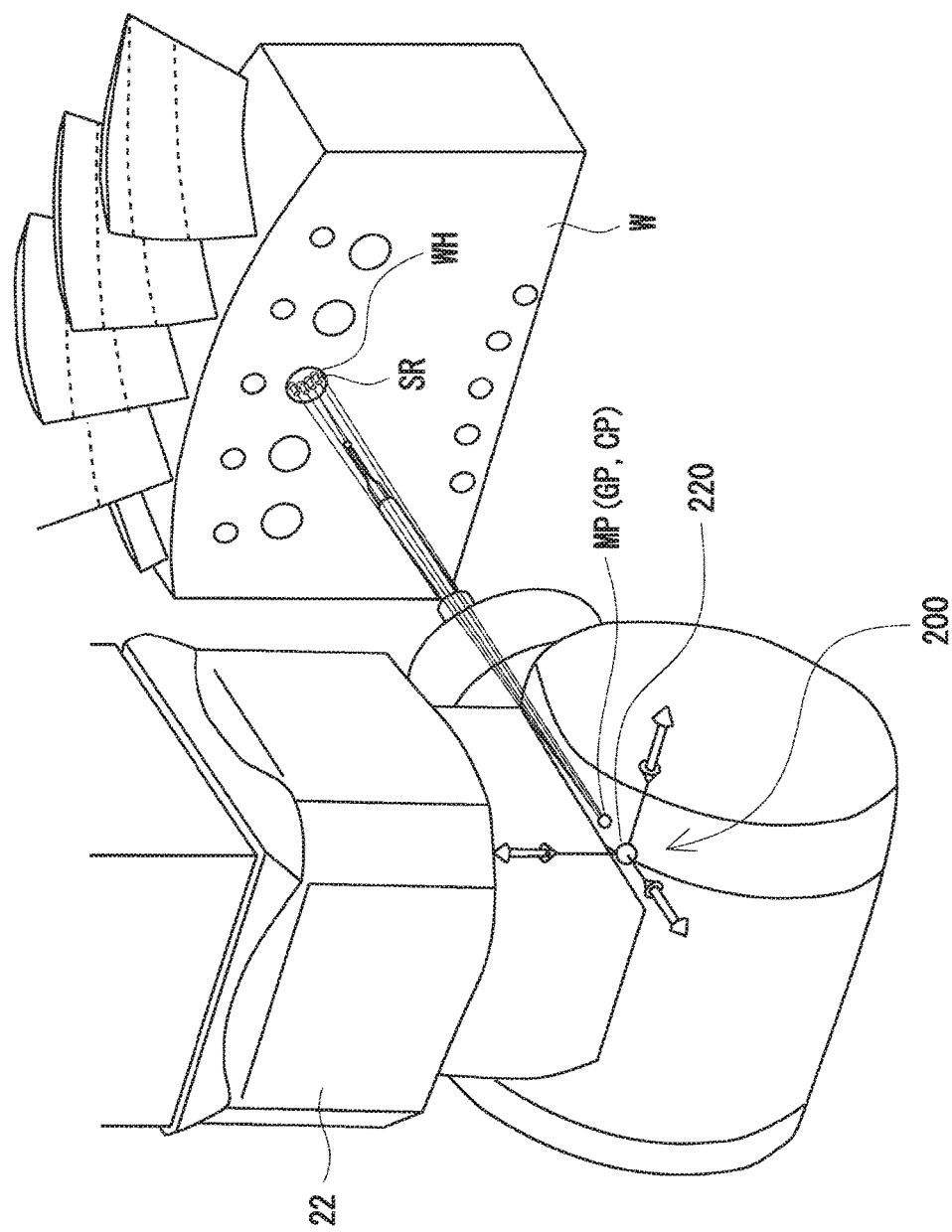
FIG. 19 illustrates the scanning path SR, the movement path MP of the probe head 22, and a layout of the control points CP.

Then, "Guide point" is selected as the adjustment guide means on the setting screen illustrated in FIG. 18, and the "Settings for Spacing CP" button is clicked (D56). As a result, the movement path MP of the probe head 22 and the control points CP corresponding to the scanning path SR are arranged on the display screen as illustrated in FIG. 19.

Herein, the position of the probe head 22 is not moved, and the contacting sphere 27 is allowed to scan-move along the inner diameter of the hole WH by the operation of each of the swing joint 25 and the rotary joint 24, so that the movement path MP corresponds to "one point".

Figure 20:
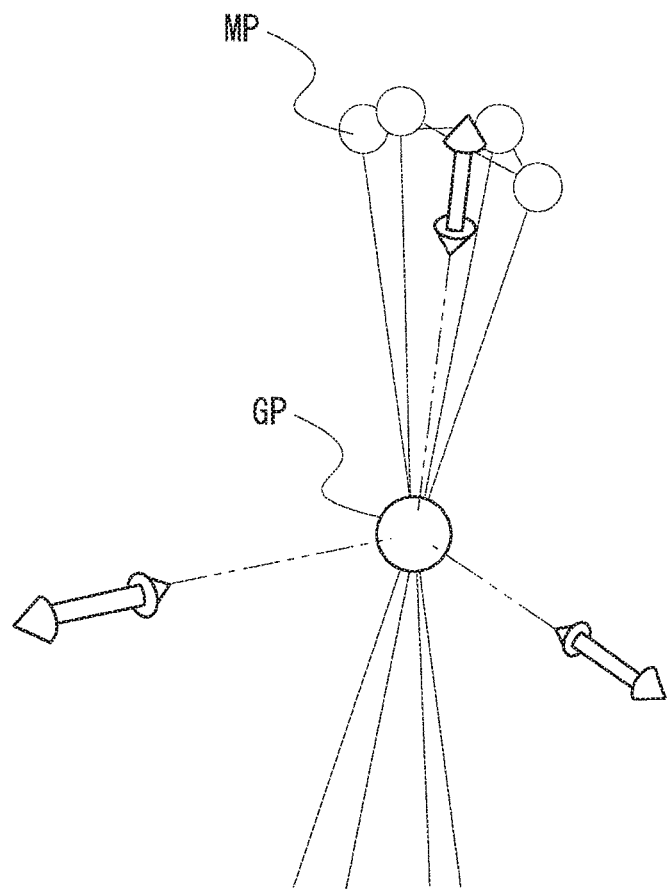
FIG. 20 illustrates an example of the movement path MP of the probe head 22.

As illustrated in FIG. 20, the probe head 22 may be moved also in the scanning measurement of the inner diameter of the hole WH.

The guide point GP may correspond to one point where the control points CP are concentrated.

The scanning path SR has a circular shape, so that the movement path MP also has a circular shape.

Accordingly, the control points CP are arranged in a circular shape. All the control points are concentrated on the center point of the circle or on one point on an axial line passing through the central axis of the circle. As a result, all the control points are collectively moved along with a movement of the point.

When the movement path corresponds to "one point" as illustrated in FIG. 19, the control points CP may be concentrated on the one point. Then, the guide point GP is disposed at a position corresponding to the one point. Accordingly, referring to FIG. 19, the guide point GP matches the "point" of the movement path MP. Further referring to FIGS. 19 and 20, the guide point and the control point overlap and appear as one point.

As with the first embodiment, the guide operation means 200 is provided to move the position of the guide point GP. In the second embodiment, the drag ball 220 and the drag axis 230 are provided, but the scale box and the rotating ring are not provided due to limitations on the degree of freedom of movement (change) of the guide point GP.

Since the drag ball 220 is disposed at the center of the control point group, the drag ball 22 overlaps the control points as illustrated in FIGS. 19 and 20.

Referring to FIG. 19, the guide point GP, the "point" of the movement path MP, and the drag ball 220 overlap each other.

In the actual measurement of a hole diameter, scanning may be performed by bringing the probe head 22 closer to the workpiece W, or by bringing the probe head 22 away from the workpiece W.

Otherwise, the probe head 22 may approach a hole from a slightly oblique direction with respect to the central axis of the hole.

In such cases, the movement path MP of the probe head 22 is collectively moved along with a movement of the drag ball 220 on the display screen.

In the case of FIG. 19, the position of the probe head 22 is moved.

Figure 21:
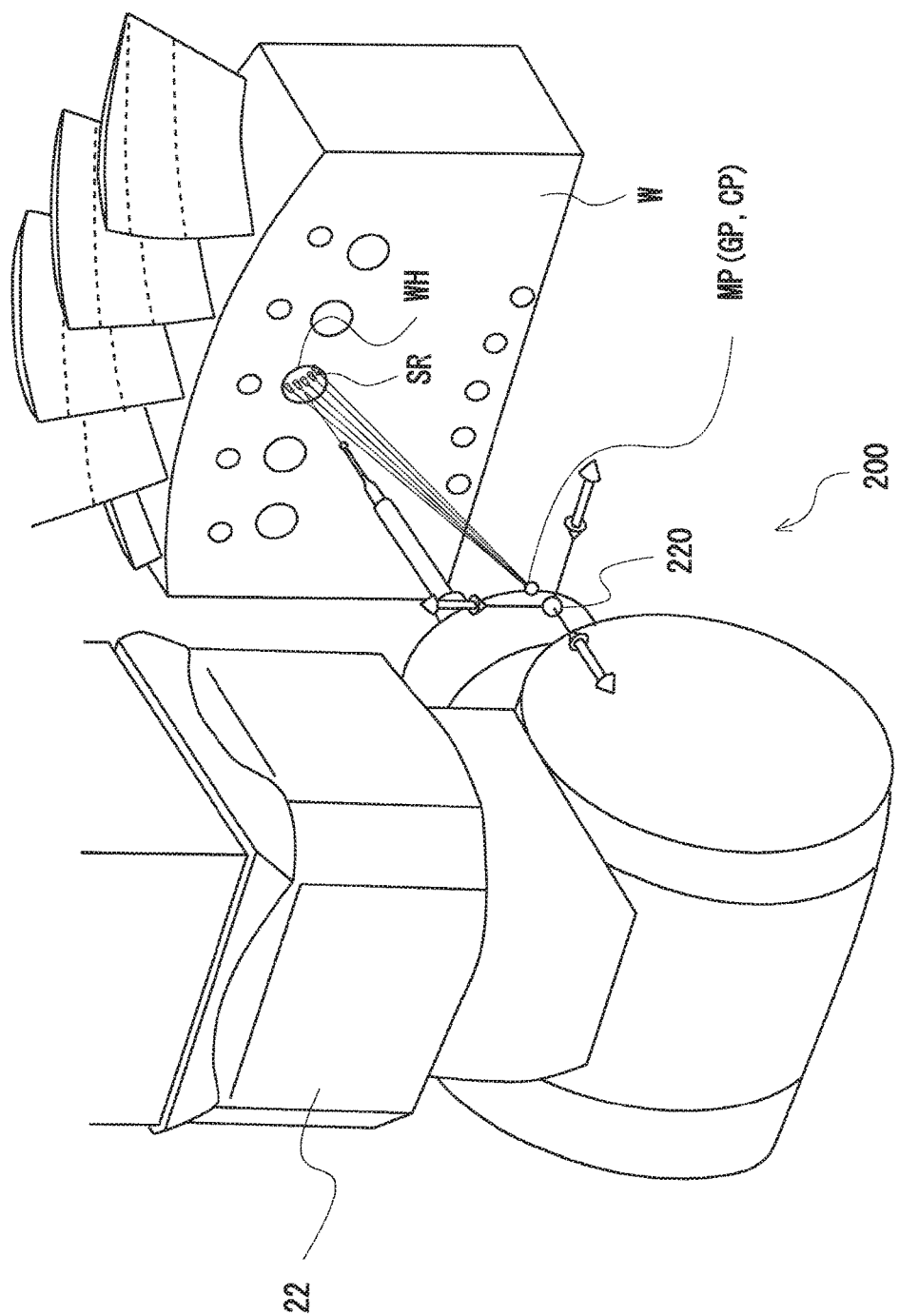
FIG. 21 illustrates a state where the guide point GP is moved in the X-axis direction.

FIG. 21 illustrates a case where the guide point GP is moved in the X-axis direction using the drag ball or the drag axis from the state illustrated in FIG. 19.

In the conventional operation, a number of control points CP are arranged even in the case of measuring a hole diameter. The operation of shifting the positions of these control points CP one by one by manual input is troublesome.

In this regard, the use of the guide point GP of this embodiment allows the control points CP to be collectively moved at one time, so that the operation is extremely simplified.

Third Embodiment

Next, a third embodiment of the present invention will be described.

While the basic structure of the third embodiment is the same as that of each of the first and second embodiments, a guide line BL will be described as an example of the adjustment guide means in the third embodiment.

Figure 22:
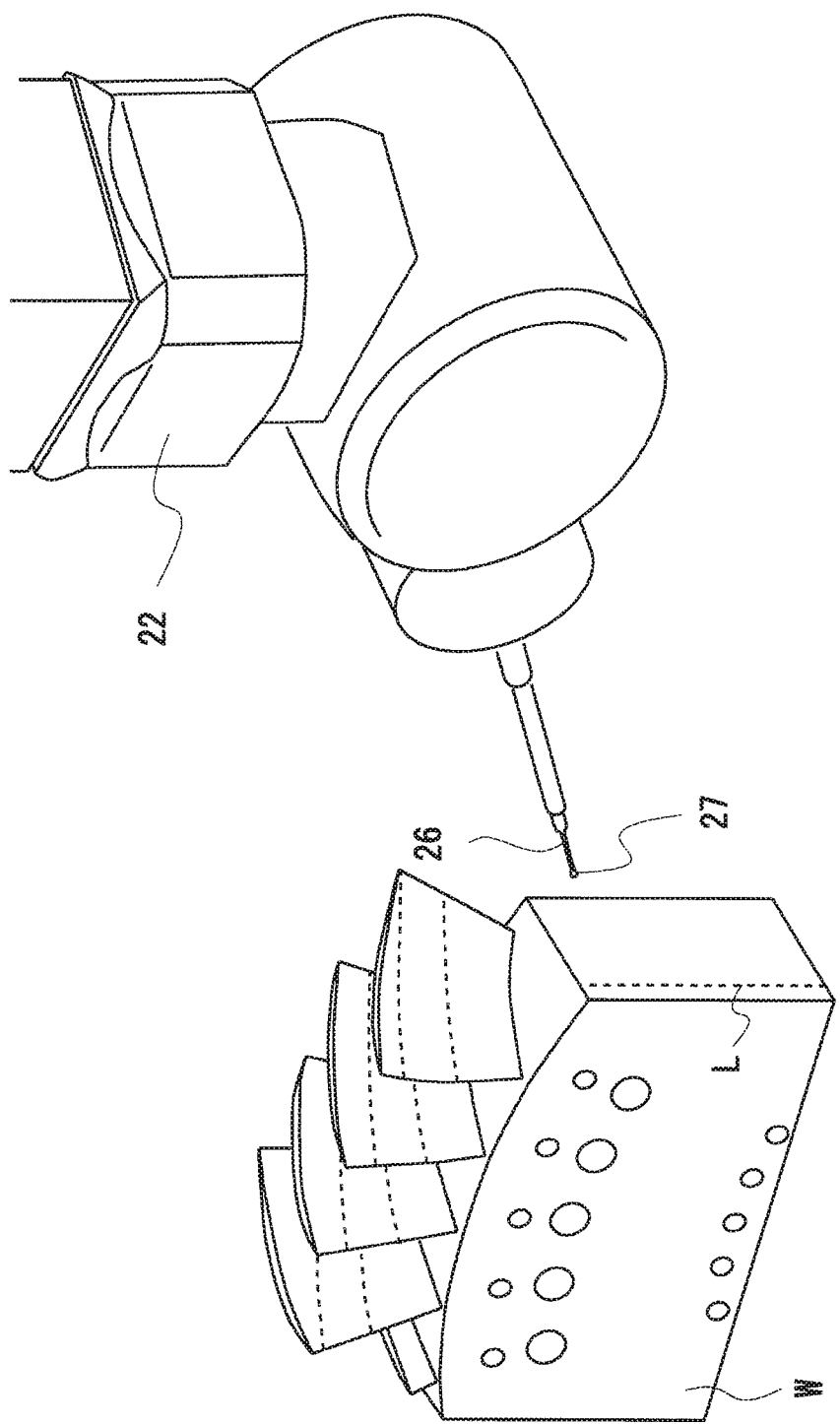
FIG. 22 illustrates a workpiece having a flat surface.

In the third embodiment, as illustrated in FIG. 22, assume that measurement is performed along a predetermined straight line on a flat outer surface of a workpiece.

In this case, the guide line GL is used as the adjustment guide means.

A line L illustrated in FIG. 22 is designated as a measurement target.

Figure 23:
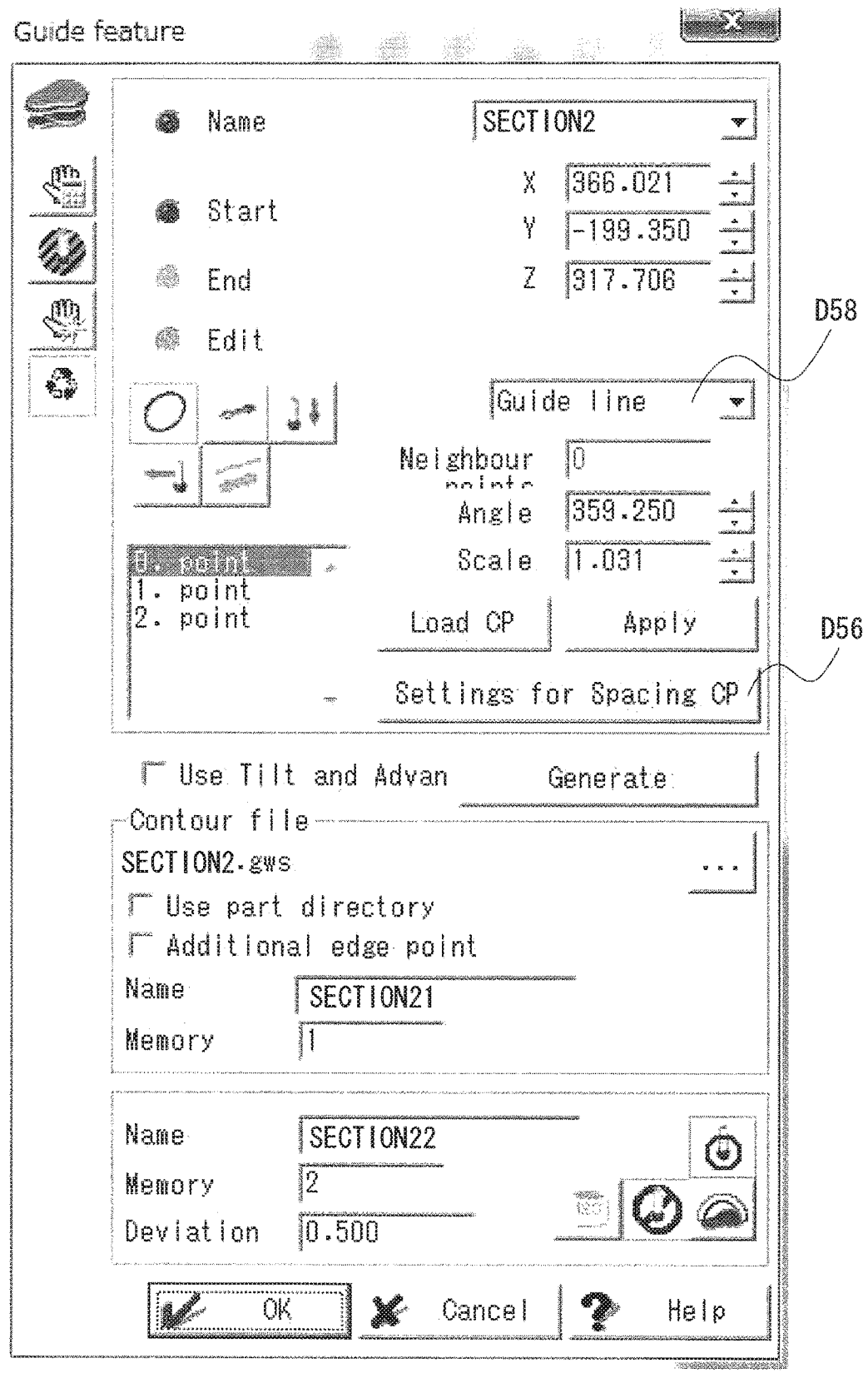
FIG. 23 illustrates an example of a screen for setting the adjustment guide means.

In the setting screen illustrated in FIG. 23, "Guide line" is selected as the adjustment guide means (D58), and "Settings for Spacing CP" button is clicked (D56).

Figure 24:
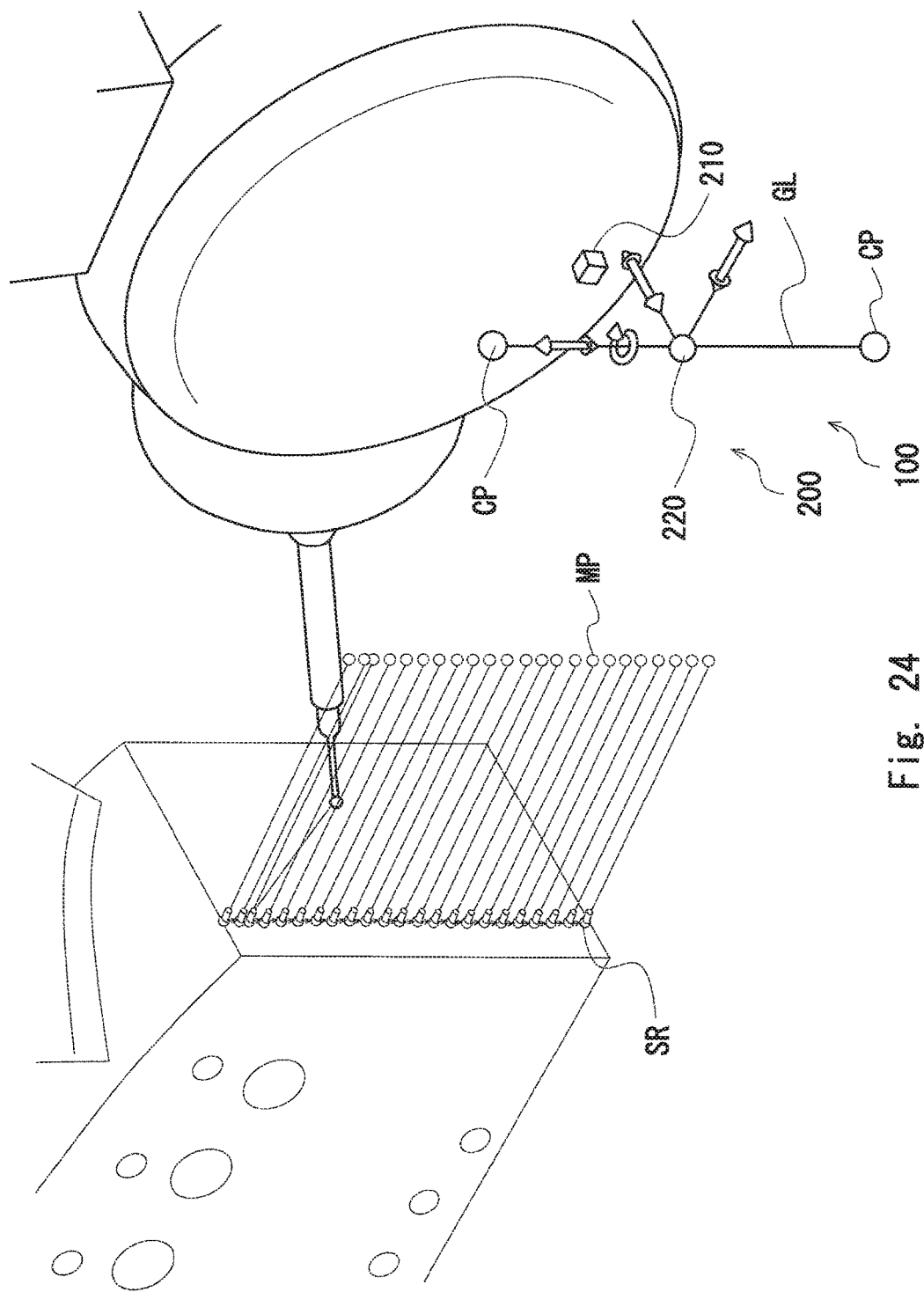
FIG. 24 illustrates the scanning path SR, the movement path MP of the probe head 22, and a layout of the control points CP.

As a result, the movement path MP of the probe head 22 and the control points CP corresponding to the scanning path SR are arranged on the display screen as illustrated in FIG. 24.

Referring to FIG. 24, the scanning path SR is a straight line, and the movement path MP of the probe head 22 is also a straight line.

Accordingly, the control points CP may be aligned on a straight line.

Herein, the guide line GL corresponds to the line connecting the control points CP at both ends.

A display of the control points CP is omitted except for control points at both ends, and only the guide line GL is displayed.

As with the first embodiment, the guide operation means 200 is provided to move the position of the guide line GL. In the third embodiment, the drag ball 220, the drag axis 230, the scale box 210, and the rotating ring 240 are arranged.

In this case, however, the rotating ring 240 is allowed to rotate only about an axis parallel with the guide line GL due to limitations on the degree of freedom of movement of the guide line GL.

The drag ball 220 is disposed at a midpoint between control points at both ends.

Figure 25:
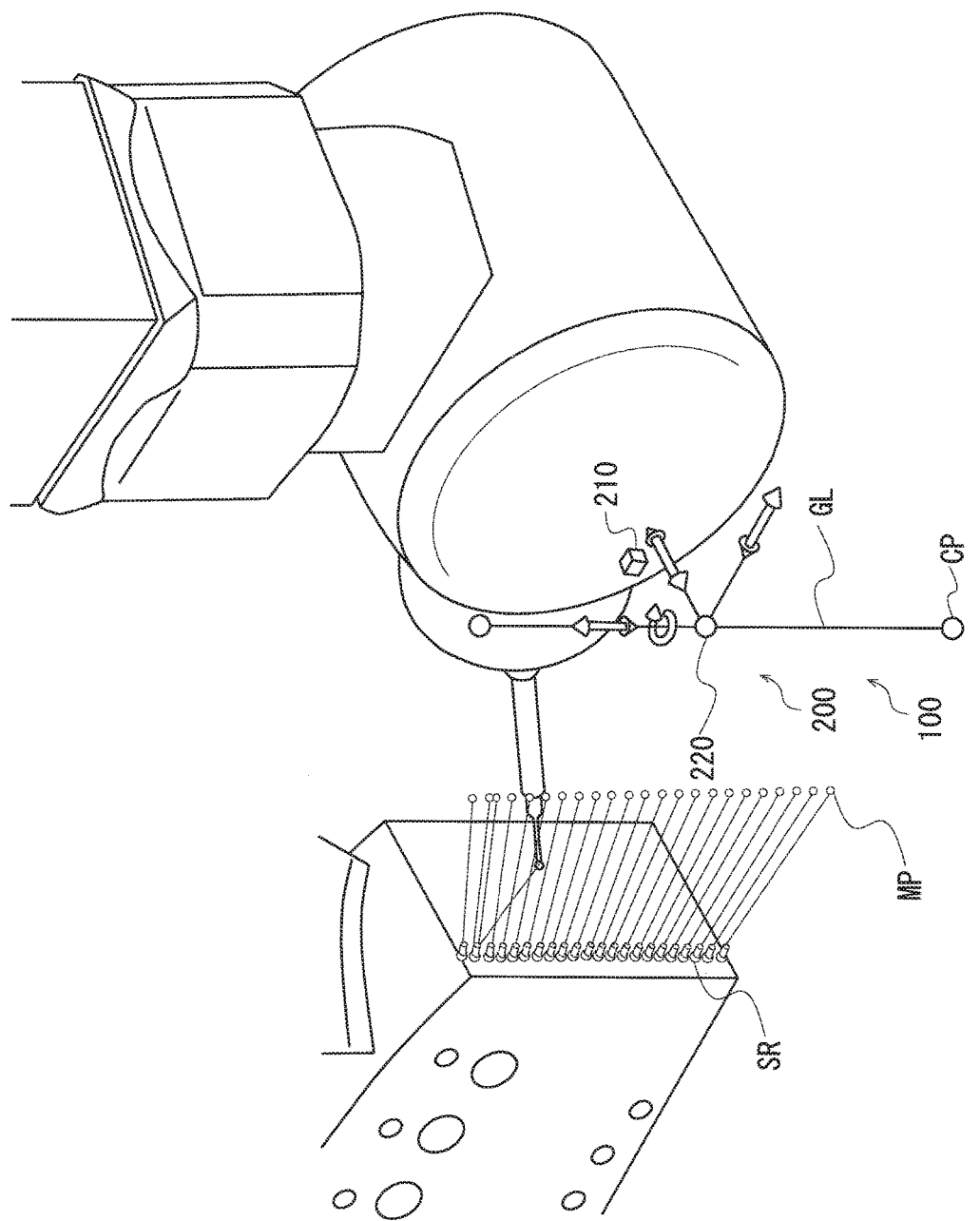
FIG. 25 illustrates a state where the interval between control points at both ends is increased.
Figure 26:
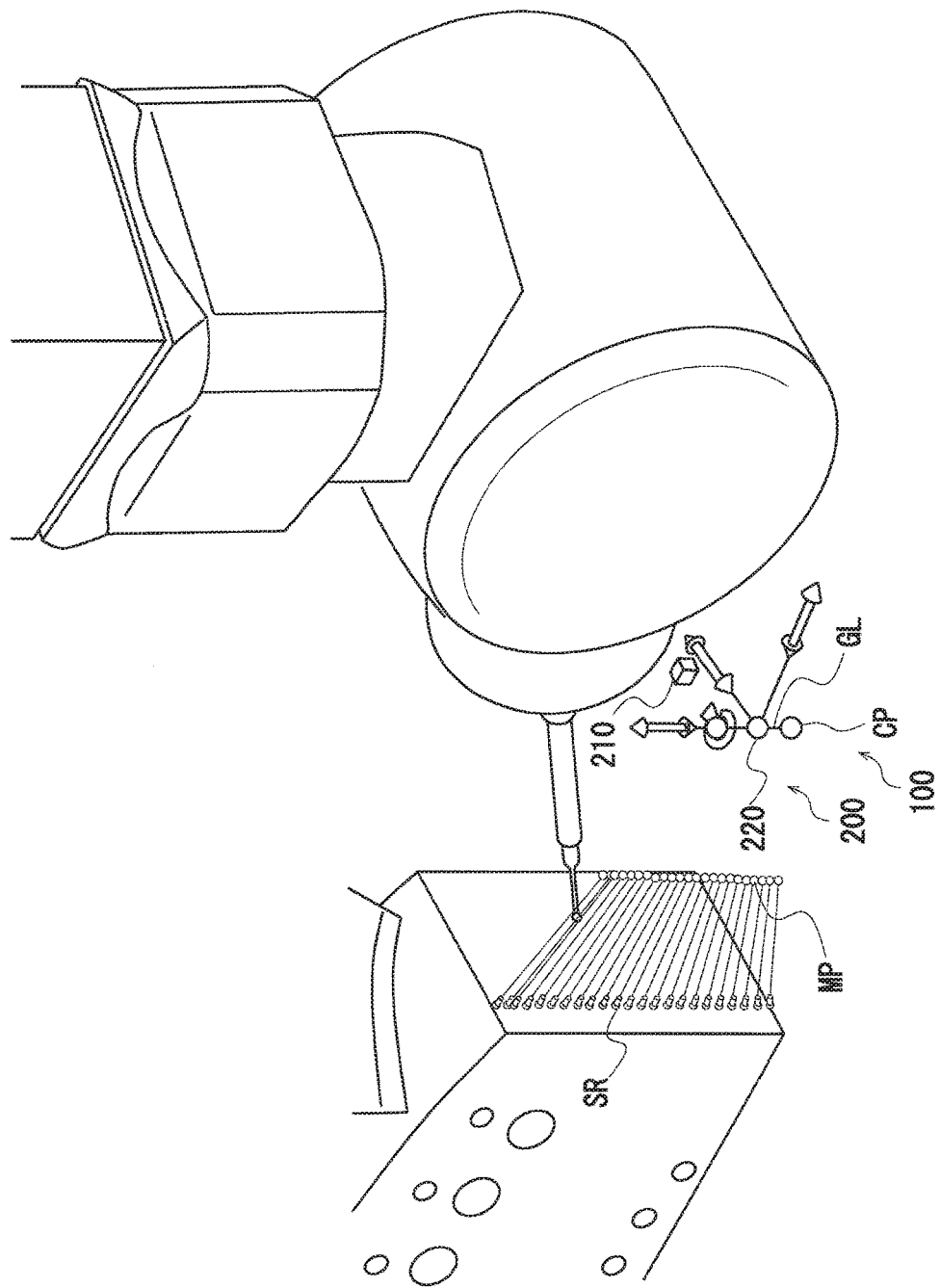
FIG. 26 illustrates a state where the interval between control points at both ends is reduced.

As operation examples, FIG. 25 illustrates an example where the guide line GL is expanded using the scale box 210, and FIG. 26 illustrates an example where the guide line GL is reduced using the scale box 210.

Along with expansion or reduction of the interval between the control points CP at both ends, all the control points CP are simultaneously moved and the movement path MP is expanded or reduced.

Figure 27:
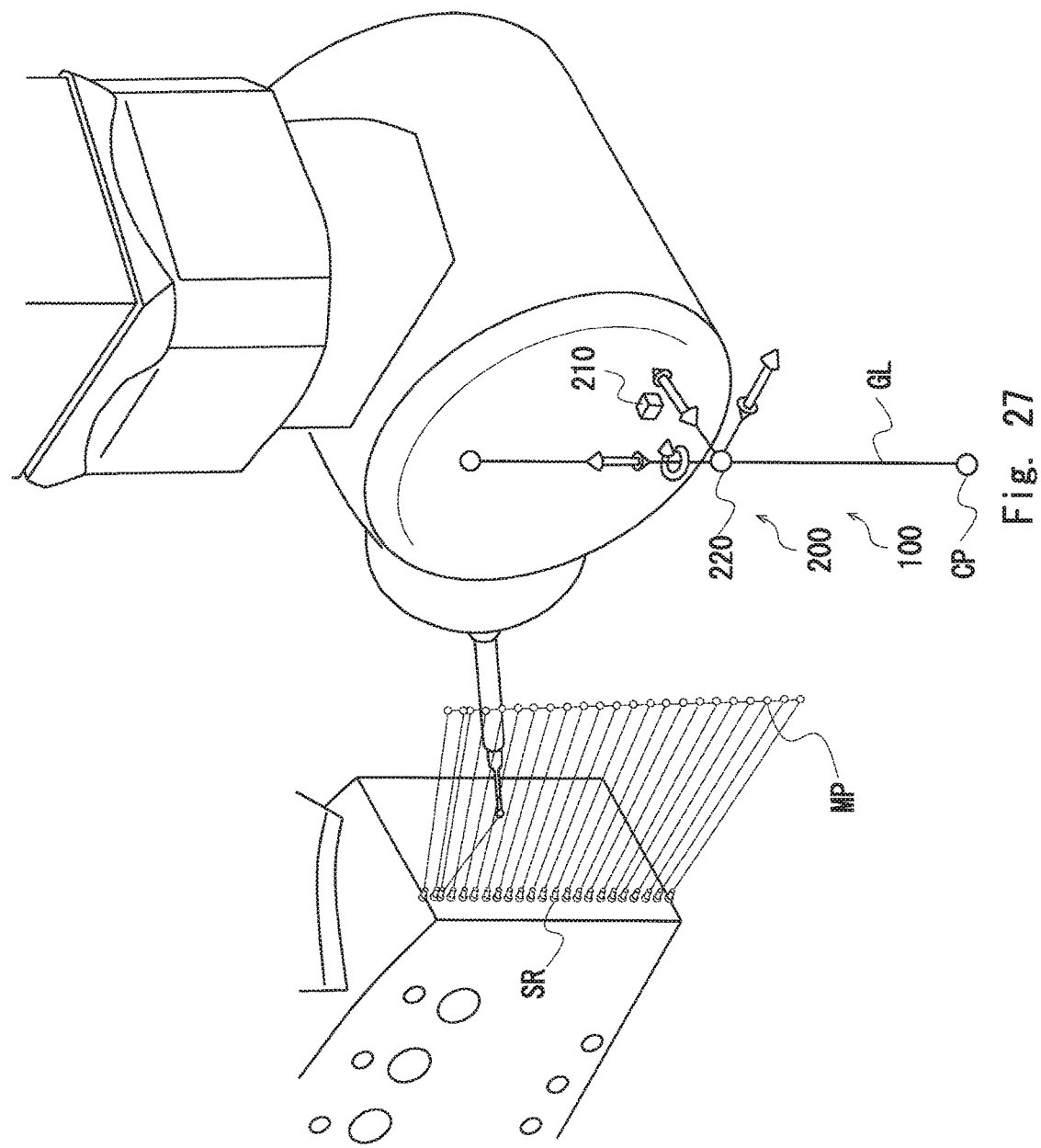
FIG. 27 illustrates a state where a guide line GL is moved in parallel.

FIG. 27 illustrates an example where the guide line GL is moved in parallel using the drag ball 220 or the drag axis 230 from the state illustrated in FIG. 25.

Also in this case, the positions of all the control points CP are changed together with the guide line GL.

Modified Example

Also in the case of using the guide line GL, three or more control points CP selected by the user, or the selected control points CP and some other control points CP around the selected control points may be moved to generate the guide line GL.

The present invention is not limited to the above embodiments, but may be modified in various manners without departing from the scope of the present invention.

An appropriate addition may be made in consideration of the usability of each user. For example, the size of an icon may be appropriately changed so as to easily recognize selected guide operation means when one of the guide operation means is selected by a mouse cursor.

Although a contact probe is used by way of example in the above embodiments, the present invention can also be applied to a non-contact scanning probe.

The above embodiments exemplify a mode in which the movement mechanism 30 of the coordinate measuring machine 20 includes the gate-shaped frame 31. However, the configuration of the coordinate measuring machine is not limited to the above embodiments, as long as the coordinate measuring machine has a function for allowing a probe to move along the surface of a workpiece.

Figure 28:
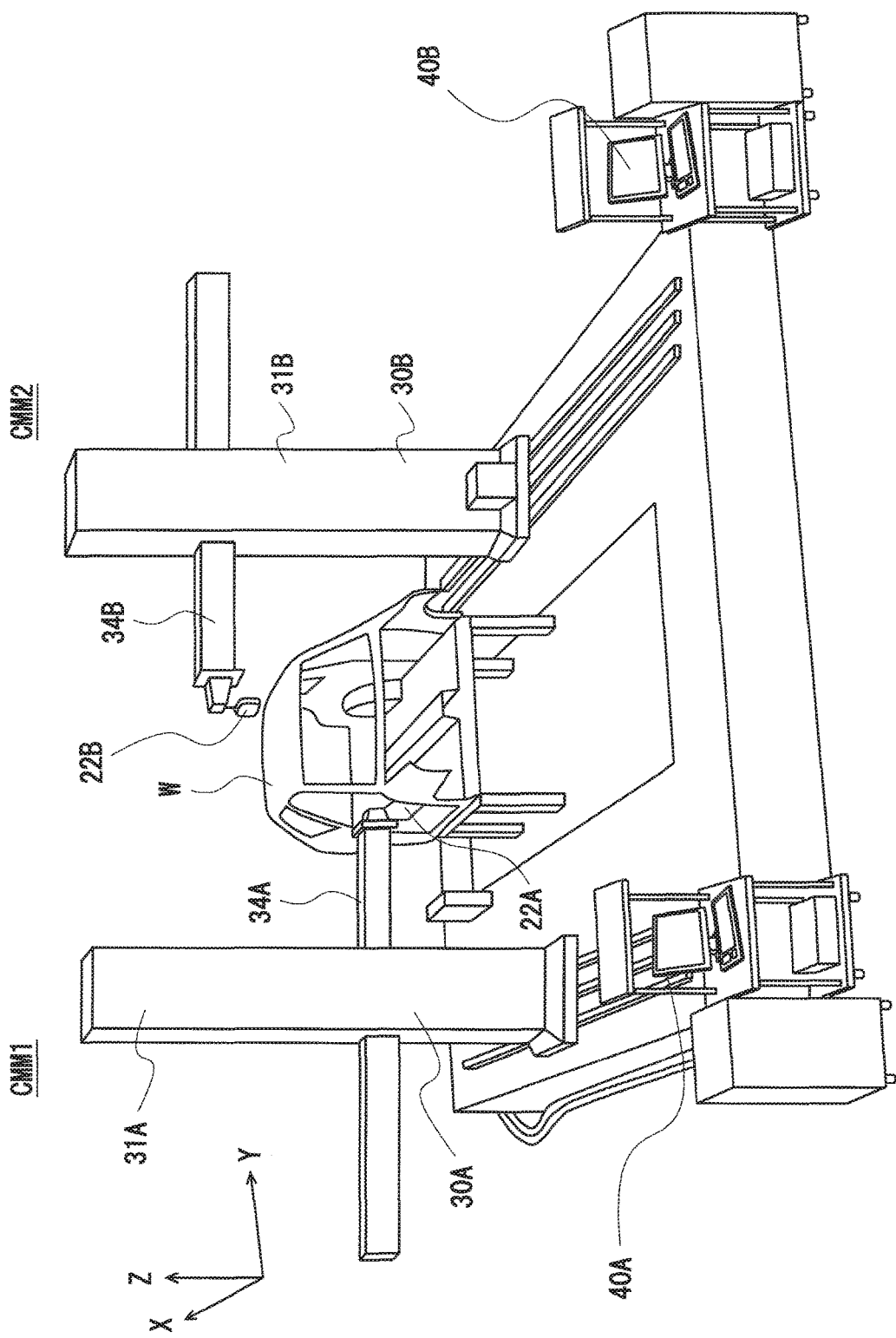
FIG. 28 illustrates an example of a horizontal shape measurement apparatus.

A shape measurement apparatus shown in FIG. 28 is illustrated by way of example.

The shape measurement apparatus illustrated in FIG. 28 in udes two three-dimensional coordinate measuring machines CMM1 and CMM2. The two three-dimensional coordinate measuring machines CMM1 and CMM2 are opposed to each other with the object to be measured W interposed therebetween.

The three-dimensional coordinate measuring machine CMM1 is provided with a spindle 34A, a probe 22A, a driving device 30A, and a controller 40A. The probe 22A is mounted at a tip of the spindle 34A. The driving device 30A drives the spindle 34A and the probe 22A. The controller 40A performs movement control for measurement.

Similarly, the three-dimensional coordinate measuring machine CMM2 is provided with a spindle 34B, a probe 22B, a driving device 30B, and a controller 40B. The probe 22B is mounted at a tip of the spindle 34B. The driving device 30B drives the spindle 34B and the probe 22B. The controller 40B performs movement control for measurement.

The spindles 34A and 34B are provided in the horizontal direction Y-direction), and are respectively supported by columns 31A and 31B each having a height in the Z-direction.

The spindles 34A and 34B are movable vertically along the columns 31A and 31B, and are slidable in the horizontal direction with respect to the columns 31A and 31B.

Accordingly, the present invention can also be applied if the spindles 31A and 34B are provided in the horizontal direction.

Herein, since the two three-dimensional coordinate measuring machines CMM1 and CMM2 are installed, the controller 40A connected to the three-dimensional coordinate measuring machine CMM1 and the controller 40B connected to the three-dimensional coordinate measuring machine CMM2 are connected together by wired or wireless linking means for allowing the controllers to be linked together. The two controllers 40A and 40B perform control in collaboration with each other, thereby achieving movement control for the overall shape measurement apparatus.

Instead of installing the two three-dimensional coordinate measuring machines, only one of the three-dimensional coordinate measuring machine CMM1 and the three-dimensional coordinate measuring machine CMM2 may be installed.

The disclosure of U.S. Pat. No. 7,971,365 (date of patent: Jul. 5, 2011) is incorporated in this application in its entirety by reference.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A CMM moving path adjustment assisting method that assists adjustment for a movement path of a probe in a coordinate measuring system, the coordinate measuring system including: a coordinate measuring machine that includes the probe having a probe tip at a tip thereof for detecting a surface of an object to be measured, and a movement mechanism for moving the probe, and measures a shape of the object to be measured by allowing the probe tip to scan the surface of the object to be measured; and a controller that controls operation of the coordinate measuring machine, the method comprising:
    calculating, by the controller, a scanning path for allowing the probe tip to perform scanning movement along the surface of the object to be measured;
    calculating, by the controller, the movement path followed by the probe when the probe tip moves along the scanning path;
    setting, by the controller, control points on a line connecting each position of the probe tip on the scanning path and each position of the probe corresponding to each position of the probe tip; and
    accepting, by the controller, a change in position of the control points by a user, and changing the movement path according to the change in position of the control points,
    wherein the controller provides a guide point for allowing a plurality of control points to move collectively,
    wherein all the control points are concentrated on one said guide point, and
    wherein upon receiving an input for operating the one said guide point, the controller causes all the control points to move collectively according to a movement of the one said guide point.

2. A CMM moving path adjustment assisting apparatus comprising:
    a coordinate measuring machine that includes a probe having a probe tip at a tip thereof for detecting a surface of an object to be measured, and a movement mechanism for moving the probe, and measures a shape of the object to be measured by allowing the probe tip to scan the surface of the object to be measured; and
    a controller that controls operation of the coordinate measuring machine,
    wherein the controller is configured to:

calculate a scanning path for allowing the probe tip to perform scanning movement along the surface of the object to be measured;

calculate the movement path followed by the probe when the probe tip moves along the scanning path;

set control points on a line connecting each position of the probe tip on the scanning path and each position of the probe corresponding to each position of the probe tip; and accept a change in position of the control points by a user, and changing the movement path according to the change in position of the control points, wherein the controller provides a guide point for allowing a plurality of control points to move collectively, wherein all the control points are concentrated on one said guide point, and wherein upon receiving an input for operating the one said guide point, the controller causes all the control points to move collectively according to a movement of the one said guide point.

* * * * *